July 23, 1940.  J. C. McCUNE  2,208,768
INERTIA TYPE BRAKE CONTROL APPARATUS
Filed Dec. 31, 1939  3 Sheets-Sheet 2

INVENTOR
JOSEPH C. McCUNE
BY
ATTORNEY

July 23, 1940.                J. C. McCUNE                2,208,768
                 INERTIA TYPE BRAKE CONTROL APPARATUS
              Filed Dec. 31, 1939          3 Sheets-Sheet 3
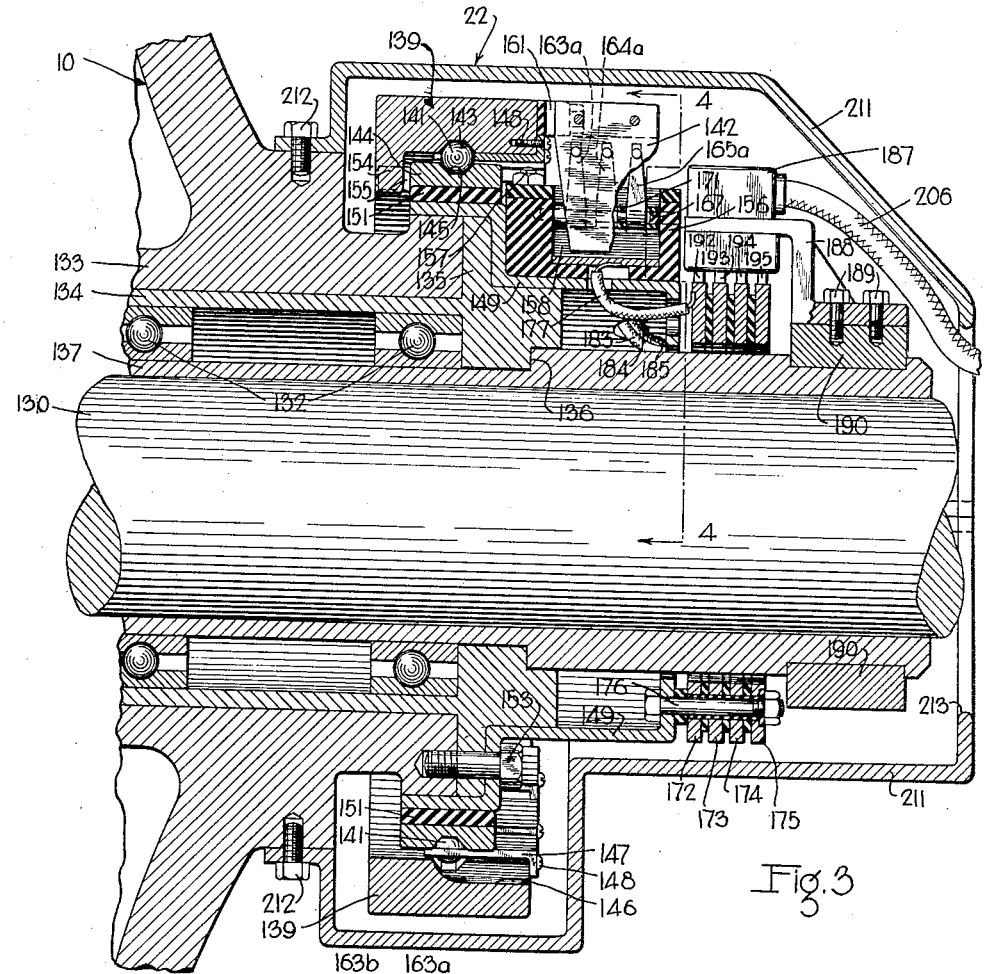
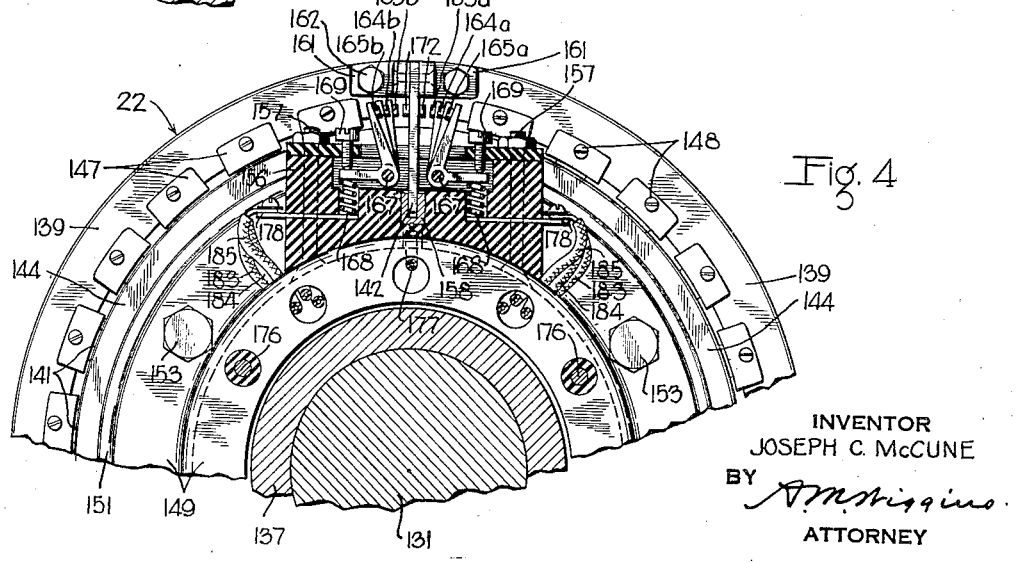
INVENTOR
JOSEPH C. McCUNE
BY
*N. M. Higgins*
ATTORNEY Patented July 23, 1940

2,208,768

UNITED STATES PATENT OFFICE 2,208,768

INERTIA TYPE BRAKE CONTROL APPARATUS

Joseph C. McCune, Edgewood, Pa., assignor to The Westinghouse Air Brake Company, Wilmerding, Pa., a corporation of Pennsylvania Application December 31, 1938, Serial No. 248,654

19 Claims. (Cl. 303—21)

This invention relates to inertia type brake control apparatus for vehicles such as railway cars or trains, and particularly to brake control apparatus including rotary inertia devices associated with the wheels or wheel-axles of a car or train and operatively responsive to the rate of change of rotative speed of the associated car wheel or axle for regulating and controlling the brakes on the wheel or axle.

In my prior Patent 2,132,959, assigned to the assignee of this application, there is disclosed a brake control equipment for railway cars and trains including a rotary inertia device associated with each wheel axle. This equipment is effective to automatically regulate the degree of a brake application so as to effect a substantially uniform rate of retardation of the train, and is also operative automatically upon the slipping of the individual wheel-axles to rapidly release the brakes on the slipping wheels to prevent sliding thereof and then reapply the brakes in response to acceleration of the slipping wheels back toward a speed corresponding to vehicle speed and to a degree determined by the length of time the slipping wheels accelerate in excess of a certain rate.

In my above-mentioned patent, fluid under pressure is automatically released from the brake cylinder applying the brakes on slipping wheels only so long as the rate of rotative deceleration of the slipping wheels exceeds a certain rate, the release of fluid under pressure from the brake cylinder or cylinders being terminated when the rate of rotative deceleration of the slipping wheels falls below a certain rate in response to the release of the brakes. If the retarding or braking force on the slipping wheel is relieved instantly and rapidly upon the initiation of slipping of the wheels, then a sufficient degree of reduction in the retarding force will be effected to cause the slipping wheels to begin to accelerate toward a speed corresponding to vehicle speed without actually reducing to a locked or non-rotative state, that is sliding. As employed herein, the term "slipping" refers to the rotation of a vehicle wheel at a speed less than that corresponding to vehicle speed as distinguished from the term "sliding" which refers to the dragging of a vehicle wheel along a road surface or rail in a locked or non-rotative state.

It is expected that, in the operation of the apparatus disclosed in my above-mentioned patent, the vehicle wheels will ordinarily respond to the automatic reduction in the degree of the application of the brakes following in response to the slipping of the wheel and accelerate back toward a speed corresponding to car or train speed even if in some cases the wheels might actually momentarily attain the sliding state. There is, however, no assurance that the vehicle wheels will accelerate back toward a speed corresponding to vehicle speed if the degree of application remaining after the automatic reduction effected in response to initial slipping of the wheels is sufficient to hold the wheels in locked condition, for then the wheels will continue to slide due to the application of the brakes at the reduced degree.

It is accordingly an object of my invention to provide a brake control system, similar in character to that disclosed in my above-mentioned patent, and including an arrangement for insuring the complete release of the brakes on a slipping wheel so that, even if the wheel does slide, the sliding will be only momentary.

More specifically it is an object of my invention to initiate the release of the brakes on a slipping wheel and continue to reduce the degree of application on the slipping wheel until such time as the wheel rotatively accelerates at a rate in excess of a certain rate while returning back toward a speed corresponding to car speed, thus insuring the complete release of the brakes on a slipping wheel if it should happen to slide.

My prior Patent 2,173,946, and assigned to the assignee of this application, discloses and broadly claims a brake control equipment, including a rotary inertia device, operating in a manner to insure release of the brakes on a slipping wheel and thus prevent more than momentary sliding of the wheel. It should be understood, therefore, that the claims of the present application do not define this release insuring feature in its broadest scope.

Another object of my invention is to provide a control valve mechanism of novel construction for effecting the rapid release of fluid under pressure from the brake cylinders when a wheel slips as well as an arrangement including the control valve mechanism for insuring the rapid resupply of fluid under pressure to the brake cylinder when the rate of acceleration of a slipping wheel back toward car speed exceeds a certain rate.

In my above-mentioned Patent 2,132,959, a rotary inertia device is provided which includes a rotary inertia element in the form of a flywheel that shifts forwardly and backwardly out of a certain neutral position with respect to a shaft rotated according to the speed of rotation of a vehicle wheel-axle in response to deceleration and acceleration respectively of the wheel-axle. The fly-wheel carries a brush element which is adapted to engage in succession a plurality of contact segments carried by the rotating shaft driven from the axle when it shifts forwardly and backwardly out of its normal position with respect to the shaft. The control system is such as to require an individual collector ring for each of the contact segments carried on the shaft in order to provide a continuous electrical connection thereto while the shaft is rotating.

It is an object of my present invention to provide a rotary inertia device of novel construction adapted to be associated with an individually mounted wheel, as distinguished from a wheel-axle, and associatively connected in a control system in such manner as to effect a substantial reduction in the number of collector rings required by the rotary inertia device.

It is a further object of my invention to provide a brake control equipment including rotary inertia devices of the character just referred to and a novel direction coordinator, adapted so that an identical operation is effected automatically under the control of the rotary inertia devices, either during the normal regulation of the retardation rate or during a slipping cycle, whether the vehicle wheels are rotating in one direction or in the opposite direction.

A further object of my invention is to provide a brake control equipment for a car or train including means for preventing undesired or erratic operation of the brakes under the control of the rotary inertia devices when subject to shocks and jars which cause momentary unintended operation of the rotary inertia devices.

The above objects, and other objects of my invention which will be made apparent hereinafter, are attained by means of an illustrative embodiment of my invention subsequently to be described and shown in the accompanying drawings wherein—

Figs. 1 and 2, taken together, represent in diagrammatic form a brake control equipment embodying my invention, Fig. 3 is a fragmentary vertical sectional view of a car wheel and a rotary inertia device associated therewith, and Fig. 4 is a sectional view taken on the line 4—4 of Fig. 3 showing in further detail the construction of the rotary inertia device.

BRIEF DESCRIPTION OF EQUIPMENT

Referring to Figs. 1 and 2 taken together, the equipment shown is that for a single car having two wheel trucks designated respectively as No. 1 and No. 2, each of which trucks comprises four wheels, only the two wheels on one side of each truck being shown for simplicity. It should be understood, moreover, that in the adaptation of the brake control equipment to a train of cars, the equipment on each of the cars substantially duplicate that shown in Figs. 1 and 2, the various train wires and train pipes, subsequently to be described, extending in the usual manner throughout all the cars of the train. It should be understood also that the brake control equipment is not limited to conventional cars but may also be applied in any obvious manner to cars of the articulated type wherein a single wheel truck supports the adjacent ends of two cars.

For illustrative purposes, the brake equipment is shown as including a brake cylinder 11 for each pair of wheels, effective to apply the brake shoes (not shown) associated with the tread or other braking surface on the car wheels upon the supply of fluid under pressure to the brake cylinders and to release the shoes upon the release of fluid under pressure from the brake cylinders. However, it should be understood that any type of brake means, such as a drum or disc type of brake means may be employed.

The brake control equipment embodying the features of my invention may be adapted to operate in connection with any type of brake apparatus whereby the supply of fluid under pressure to the brake cylinders and the release therefrom may be effected under manual control. For illustrative purposes, there is shown in Figs. 1 and 2 a so-called straight-air brake system including a straight-air pipe 12 extending from car to car throughout the train and to which fluid under pressure is supplied from a main reservoir 13 on one of the cars, such as the control car, under the control of a manually operated self-lapping brake valve 14. The pressure established in the straight-air pipe 12 is effective to operate a so-called adjusting relay 15, one of which is provided for each wheel truck for a purpose which will be made apparent hereinafter, the relay 15 being effective in turn to supply fluid under pressure from a supply reservoir 16, one of which is provided for each car, to the brake cylinders 11 of the associated wheel truck.

The supply reservoir 16 on each car is charged with fluid under pressure from the main reservoir 13 as from a so-called reservoir pipe 17 extending from car to car throughout the train.

Associatively connected in the supply communication to the adjusting relays 15 is a volume reservoir 18 which provides the necessary volume to insure stabilized control of the fluid pressure operating the adjusting relays 15.

The operating fluid pressure for the adjusting relays 15 is under the control of a so-called cut-off magnet valve 19 and a release magnet valve 21 which are in turn controlled electrically by the rotary inertia devices 22 associated individually with each wheel and hereinafter to be described in detail.

Interposed in the supply communication from each of the adjusting relays 15 to the brake cylinders 11 for the corresponding wheel truck is a so-called slip magnet valve 23 and associated therewith a so-called reapplication magnet valve 24.

The slip magnet valve 23 is operated under the control of the rotary inertia devices 22 of the corresponding wheel truck, when any one of the four wheels of the truck begins to slip, to cut off the supply of fluid under pressure from the supply reservoir 16 to the brake cylinders 11 of that truck and rapidly release fluid under pressure therefrom.

The reapplication magnet valve 24 is operatively controlled by the rotary inertia devices 22 of the corresponding wheel truck to resupply fluid under pressure from local supply reservoirs 25 to the brake cylinders 11 under the control of the rotary inertia devices 22 when the slipping car wheel accelerates back toward a speed corresponding to car speed.

The operation of the release magnet valves 21 on all the cars of the train are synchronized through the medium of a so-called synchronizing train wire 34 which extends from car to car throughout the train, each car being provided with electromagnetic switches or relays 35 and 36.

The relay 35 is under the control of the rotary inertia devices 22 associated with any of the wheels of either of the wheel trucks No. 1 and No. 2 of a car to effect energization of the synchronizing train wire. The relay 36 is connected to and operated on the energization of the synchronizing train wire 34 to effect operation of the release magnet valve 21.

A so-called direction coordinator 26 is provided for each wheel truck including a plurality of electromagnetic switches or relays 27, 28 and 29 for causing the rotary inertia devices 22 to effect operation of the slip magnet valve 23 and re-application magnet valve 24 in sequence whether the car wheels are rotating in one direction or the opposite direction upon application of the brakes resulting in slipping of the wheels.

A suitable source of electric current for operating the equipment is provided, illustrated in the form of two batteries 30 and 31. Associated with battery 31 is a pressure operated switch device 32 for preventing the supply of current from the battery unless the pressure established in the volume reservoir 18 and effective to operate the adjusting relays 15 exceeds a certain low pressure such as five pounds per square inch.

In addition a choke or inductance coil 33 is provided in the electrical circuits in such manner as to prevent undesired and erratic operation of the brakes under the control of the rotary inertia devices when the rotary inertia devices are momentarily and undesirably actuated in response to impact or shock to the cars, as during switching operations.

DETAILED DESCRIPTION OF EQUIPMENT

Figure 1:
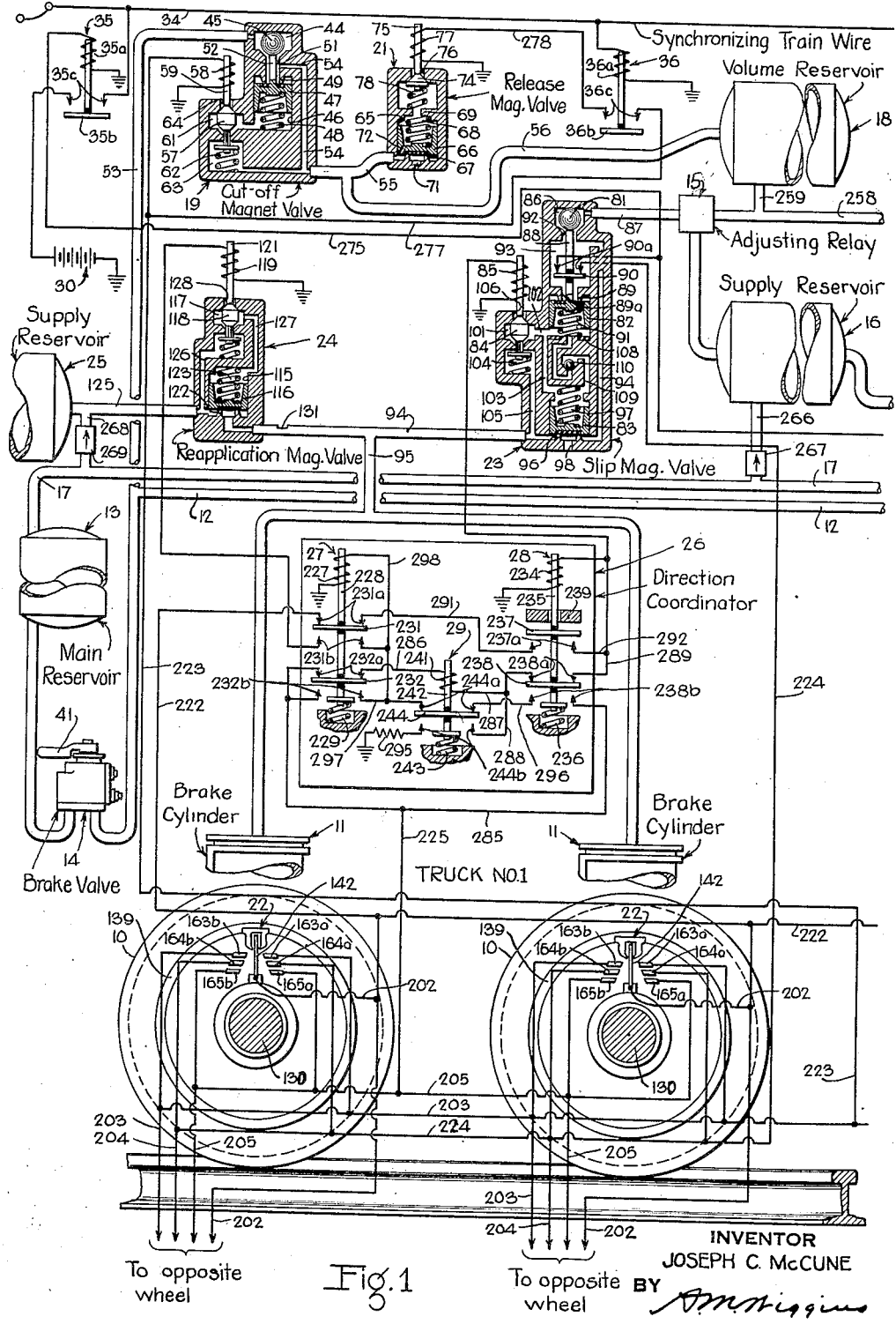

Each of the various above-mentioned parts of the equipment will now be considered in detail and the cooperative relation thereof with other parts of the equipment described in order to obtain a comprehensive understanding of the equipment.

The self-lapping manually operated brake valve 14 is illustrated in outline form only for the reason that the construction and operation thereof is shown and described in detail and claimed in Patent 2,042,112 of Ewing K. Lynn and Rankin J. Bush. Since reference may be had to the above-mentioned patent it is deemed necessary, for purposes of the present application, to explain the operation of the brake valve device 14 only functionally. With the operating handle 41 of the brake valve 14 in its normal position, fluid under pressure in the straight-air pipe 12 is vented to atmosphere at the brake valve device 14 and thus the straight-air pipe 12 is normally at atmospheric pressure. When the brake valve handle 41 is shifted in a horizontal plane out of its normal position in a so-called service zone, fluid under pressure is supplied from the main reservoir 13 to straight-air pipe 12 and the brake valve is automatically effective to establish a pressure in the pipe 12 which corresponds substantially to the degree of displacement of the brake valve handle 41 out of its normal release position. When the brake valve handle is shifted further into a so-called emergency position, maximum pressure corresponding to main reservoir pressure is established in the straight-air pipe 12. The brake valve 14 has a pressure-maintaining operation and thus if the pressure in the straight-air pipe 12 tends to diminish due to leakage, the brake valve device 14 automatically functions to maintain the pressure corresponding to the position of the brake valve handle 41.

The adjusting relay 15 may be of any suitable construction whereby it may be manually set or adjusted according to the weight or load, calculated or measured, carried by a particular wheel truck corresponding thereto, so as to automatically and correspondingly proportion the pressure of the fluid established in the brake cylinders of the associated wheel truck to different degrees, in response to and with respect to any given operating pressure. The adjusting relays 15 are not a part of my present invention and accordingly it is deemed unnecessary to show the construction thereof and describe them in detail. It should be understood that the adjusting relays 15 are not automatically sensitive to variations in the load carried by a wheel truck. The adjusting relays 15 are merely set initially by hand upon the installation of the equipment and thereafter no adjustment is made except as effected manually. The purpose of the adjusting relays 15 is to provide some means whereby to establish in the brake cylinders of wheel trucks carrying different loads, different pressures varying in some measure according to the load on the truck, in response to a selected degree of application of the brakes set up under manual control.

The cut-off magnet valve 19 comprises a casing having a chamber 44 containing a ball valve 45 and a bore 46 containing a valve piston 47. Interposed between the casing and the back side of the valve piston 47 within the bore 46 is a coil spring 48 that normally yieldingly urges the valve piston 47 upwardly into seated relation on an annular rib seat 49 which surrounds the opening of a passage 51 connecting the chamber 44 to the bore 46. The valve piston 47 is provided with a stem 52 which projects through the passage 51 into the chamber 44 and which is of such length as to unseat the ball valve 45 from a cooperating valve seat, formed on the casing at the end of passage 51 opposite to the annular rib seat 49, when the valve piston 47 is seated on the annular rib seat 49.

The chamber 44 is constantly connected to the straight-air pipe 12 through a branch pipe 53 and the passage 51 is connected by a branch passage 54 and pipes 55 and 56 to the volume reservoir 18.

The cut-off magnet valve further comprises an electromagnetically operated valve having a double beat valve 57 and an electromagnet winding 58 associated with a plunger-like stem 59 of the double beat valve. The double beat valve 57 is contained in a chamber 61, formed in the casing of the cut-off magnet valve 19, which is in open communication with the bore 46 at the back of the valve piston 47. With the electromagnet winding 58 deenergized, the double beat valve 57 is urged upwardly to an upper seated position by a coil spring 62 and communication is established past the lower seat of the double beat valve 57 between the chamber 61 and a chamber 63 to which the pipe 55 is connected through a passage 55. It will accordingly be seen that when fluid under pressure is supplied through pipe 53 to the volume reservoir 18, the pressure of the fluid acts on the back side of the valve piston 47 and, aided by the spring 48, prevents downward movement of the valve piston 47. Accordingly the ball valve 45 is maintained unseated to maintain open the communication through which fluid under pressure may be supplied from the pipe 53 to the volume reservoir 18.

When the electromagnet winding 58 is energized, the double beat valve 57 is actuated to its lower seated position wherein the supply communication to the back side of the valve piston 47 is closed and communication is established past the upper valve seat of the valve 57 through an exhaust port 64 opening out of the chamber 61 so that fluid under pressure is vented from the back side of valve piston 47. The pressure of the fluid supplied through the pipe 53 and active in the passage 51 on the valve piston 47 is thus effective to overcome the spring 48 and shift the valve piston downwardly so that the stem 52 of the valve piston 47 is withdrawn from supporting relation under the ball valve 45 which then drops into seated relation on its associated valve seat to close communication from the chamber 44 to the passage 51.

It will thus be seen that as long as the electromagnet winding 58 of the cut-off magnet valve 19 is deenergized, fluid under pressure may be supplied through the pipe 53 to the volume reservoir 18 and that when the electromagnet winding 58 is energized, the supply communication to the volume reservoir is closed.

The release magnet valve 21 comprises a casing having a bore 65 in which a valve piston 66 operates. Valve piston 66 is normally urged downwardly into seated relation on an annular rib seat 67 by a coil spring 68 interposed between the back side of the valve piston and an annular flange 69 formed in the casing and projecting into the bore 65. Pipe 55 leading from the cut-off magnet valve 19 is connected into the space at the outer seated area of the valve piston 66 and an exhaust port 71 of a certain selected flow area opens out of the inner seated area of the valve piston within the annular rib seat 67. The valve piston 66 is provided with a restricted port 72 therein through which fluid under pressure may flow to the back side of the valve piston 66 within the bore 65.

The release magnet valve 21 further comprises an electromagnetically operated valve having a valve 74 of the poppet type provided with a plunger like stem 75 which projects through an exhaust port 76 in the wall of the casing and has associated therewith an electromagnet winding 77. The valve 74 is contained in an extension of the bore 65 and is normally urged into seated relation on an associated valve seat formed on the casing by a coil spring 78 interposed between the valve and the side of the annular flange 69 opposite to that engaged by the spring 68.

With the electromagnet winding 77 of the release magnet valve 21 deenergized, the valve 74 is maintained in seated position and thus when fluid under pressure is supplied through the pipes 55 and 56 to the volume reservoir 18, the fluid under pressure which flows through the restricted port 72 in the valve piston 66 to the back side thereof, assisted by the spring 68, maintains the valve piston 66 in seated relation on the annular rib seat 67. When the magnet winding 77 of the release magnet valve 21 is energized, the valve 74 is unseated and the space within the bore 65 at the back side of the valve piston 66 is vented to atmosphere through the exhaust port 76. In such case, the pressure of fluid acting on the outer seated area of the valve piston 66 overcomes the spring 68 and shifts the valve piston upwardly, thereby unseating it from the annular rib seat 67. With the valve piston 66 unseated, fluid under pressure is accordingly vented from the pipe 55 and connected volume reservoir 18 through the exhaust port 71, at a rate determined by the size of the port which is selected on a basis hereinafter explained. The port 72 in the valve piston 66 permits only a restricted flow of fluid under pressure to the back side of the valve piston 66, and thus once the valve piston 66 is unseated upwardly it is maintained unseated as long as the magnet winding 77 is energized and the valve 74 unseated. When magnet winding 77 is deenergized and valve 74 reseated, the chamber formed at the back side of valve piston 66 within bore 65 is promptly charged with fluid under pressure through port 72 and the spring 68 thus promptly reseats the valve piston.

As previously explained, each of the wheel trucks No. 1 and No. 2 is provided with a slip magnet valve 23 and a reapplication magnet valve 24. The slip magnet valves and reapplication magnet valves for the two wheel-trucks are identical in construction and operation and accordingly only those for truck No. 1 are shown in detail and described herein.

The slip magnet valve 23 comprises a casing in which are contained a one-way or check valve device in the form of a ball valve 81, a valve piston 82, a release valve in the form of a valve piston 83, and a double beat valve 84 operated by an electromagnet winding 85 for controlling the operation of the valve pistons 82 and 83. The ball valve 81 is contained in a chamber 86 which is constantly connected to the brake cylinder supply pipe 87 leading out of the corresponding relay 15. The ball valve 81 is normally held unseated by the upwardly projecting stem 88 of the valve piston 82 which is normally maintained in an upper seated position on an annular rib seat 89, by a coil spring 91 interposed between the casing and the back side of the valve piston 82. In its upper seated position valve piston closes a port 89a in the casing connecting the bore, in which the valve piston 82 operates, to a chamber 93. The stem 88 on valve piston 82 extends through port 89a, chamber 93 and a passage 92 connecting the chamber 93 to chamber 86. Chamber 93 is in constant communication through a passage and pipe 94, and a branch pipe 95 with the two brake cylinders 11 of the associated wheel truck. Accordingly, with the ball valve 81 unseated, fluid under pressure may be supplied from the supply reservoir 16 to the brake cylinders 11 in response to the operation of the corresponding relay 15.

A switch device operated by movement of the stem 88 of valve piston 82 is provided in chamber 93 and comprises a contact member 90, carried in insulated relation on the stem 88, and a pair of associated contact members 90a, carried in spaced insulated relation on the casing. The contact members 90a are so positioned as to be simultaneously engaged by contact member 90 only when the valve piston 82 is in its upper seated position. The purpose of this switch device will be made apparent hereinafter.

The release valve piston 83 operates in a suitable bore in the casing and is normally urged downwardly into seated relation on an annular rib seat 96, by a coil spring 97, thereby closing a relatively large exhaust port 98 within the annular rib seat 96. The outer seated area of the release valve piston 83 is open to the passage 94 and thus when valve piston 83 is unseated, fluid under pressure is exhausted from passage and pipe 94 and the connected brake cylinders 11 at a rapid rate through exhaust port 98.

The double beat valve 84 is contained in a chamber 101 which is connected by a passage 102 to the chamber at the back side of the valve piston 82 and a branch passage 103 of passage 102 to the chamber at the back side of the valve piston 83. In its upper seated position to which it is urged by a coil spring 104 the double beat valve 84 closes an exhaust port 106 opening out of chamber 101 and simultaneously establishes communication past the lower seat thereof from chamber 101 to a branch passage 105 of the brake cylinder supply passage 94. Thus with the double beat valve 84 in its upper seated position, fluid under pressure supplied into the brake cylinder passage and pipe 94 flows to the chambers at the back side of both the valve pistons 82 and 83 thereby causing valve piston 82 to maintain the ball valve 81 unseated and also causing the release valve piston 83 to be seated.

Energization of the magnet winding 85 causes the double beat valve 84 to be shifted to its lower seated position in which the supply communication from the branch passage 105 to the chambers at the back side of the valve pistons 82 and 83 is closed and the fluid under pressure vented to atmosphere from these chambers through the exhaust port 106. The supply pressure in chamber 93 effective on the inner seated area of the valve piston 82 is accordingly effective to overcome the spring 91 and the valve piston 82 is accordingly shifted downwardly into seated relation on an annular gasket 108, thereby closing the connection between passage 102 and the chamber at the back side of the valve piston 82. The chamber at the back side of the valve piston 82 is connected through a passage 109 with the chamber at the back side of the release valve piston 83 and a ball check valve 110 is provided in the passage 109 in a manner to permit the exhaust of fluid under pressure past the valve 110 from the chamber at the back side of the valve piston 82 and to prevent the reverse flow of fluid under pressure therepast. It will thus be seen that once the valve piston 82 is shifted downwardly into seated relation on the annular gasket 108, the chamber at the back side of the valve piston is isolated at atmospheric pressure and thus the valve piston is maintained thereafter in such position by the fluid pressure in chamber 93 acting over the entire outer face thereof against the yielding force of the spring 91. Spring 91 is of such strength as to be ineffective to return the valve piston 82 upwardly into seated relation on the annular rib seat 89 from the annular gasket seat 108 unless the pressure acting on the outer face of the valve piston 82 is reduced to a relatively low pressure such as five pounds per square inch.

It should accordingly be understood that when the double beat valve 84 is actuated to its lower seated position upon energization of the magnet winding 85, the supply of fluid under pressure to the brake cylinders 11 from the supply reservoir 16 under control of relays 15 is cut off and fluid under pressure is vented from the brake cylinders 11 under the control of the release valve 83 through the exhaust port 98 at a very rapid rate. When the magnet winding 85 is deenergized and the double beat valve 84 is returned to its upper seated position, fluid under pressure flows from the passage 94 to the chamber at the back of the release valve piston 83 past the lower valve seat of the double beat valve 84 so that the release valve piston 83 is substantially immediately restored to seated position on annular rib seat 96 to prevent the further exhaust of fluid under pressure from the passage 94 through the exhaust port 98.

Although fluid under pressure is supplied to the chamber at the back side of the release valve piston 83, check valve 110 prevents flow of fluid under pressure therefrom through the passage 109 to the chamber at the back side of the valve piston 82 which is maintained in seated relation on annular gasket 108 by the pressure of the fluid in the chamber 93. Thus, once the magnet winding 85 is energized, the ball valve 81 is effective to cut off the supply of fluid under pressure to the brake cylinder under the control of the adjusting relay 15 and cannot thereafter be unseated so as to permit the supply of fluid under pressure to the brake cylinders under the control of the adjusting relay 15 unless the brake cylinder pressure acting to hold the valve piston 82 seated on gasket seat 108 is substantially completely reduced to atmospheric pressure.

The reapplication magnet valve 24 comprises a casing having a bore 115, in which a valve piston 116 operates, and a chamber 117 containing a double beat valve 118 which is operated by an electromagnetic winding 119 through the medium of an associated plunger 121 or stem fixed to the valve 118. The valve piston 116 is normally urged downwardly into seated relation on an annular rib seat 122 by a coil spring 123 that is interposed between the casing and the back side of the valve piston 116 within the bore 115. The brake cylinder supply pipe 94 is connected into the space at the inner seated area of the valve piston 116 within the annular rib seat 122 and the space at the outer seated area of the valve piston 116 is connected by a pipe and passage 125 to a supply reservoir 25.

With the double beat valve 118 in its upper seated position, communication is established past the lower valve seat thereof through a branch passage 126 of the passage 125, chamber 117 and a passage 127 connecting the chamber 117 and the chamber at the back side of the valve 116. Thus fluid under pressure is supplied from the supply reservoir 25 to the chamber at the back side of the valve piston 116 to maintain it in seated relation on the annular rib seat 122.

When the magnet winding 119 is energized and the double beat valve 118 thus actuated to its lower seated position, the communication just described, through which fluid under pressure is supplied from supply reservoir 25 to the chamber at the back side of the valve piston 116 of the reapplication magnet valve 24, is closed and fluid under pressure is vented from the chamber at the back side of the valve piston 116 past the upper valve seat of the double beat valve 118 to atmosphere through an exhaust port 128. The pressure of the fluid from the supply reservoir 25 acting on the outer seated area of the valve piston 116 accordingly becomes effective to overcome the spring 123 and shift the valve piston upwardly and unseat it from the annular rib seat 122, thereby establishing communication between supply pipe and passage 125 and the brake cylinder pipe 94.

The brake cylinder pipe 94 is provided with a restricted portion or choke 131 which serves to control the rate of supply of fluid under pressure from the supply reservoir 25 to the brake cylinders 11 in the manner to be hereinafter more fully explained.

The reapplication magnet valve 24 is of large capacity and exceedingly rapid in operation, the valve piston 116 being almost instantaneously unseated and seated in response to the energization and deenergization of the magnet winding 119, thereby enabling a very rapid build-up as well as a very accurate control of the pressure established under the control thereof in the brake cylinders 11.

Referring to the drawings, particularly Figs. 3 and 4, it will be seen that a rotary inertia device 22 is provided in associated relation with each car wheel 10. Each car wheel 10 may be individually mounted in any suitable manner as for example on an axle 130 which is non-rotatably fixed to the wheel truck frame in a manner not shown and disposed transversely of the car and track rails in the manner similar to the usual rotating axle, a pair of wheels 10 being supported at opposite ends respectively of a single axle for rolling on the opposite rails of the car track. Suitable anti-friction bearings, such as the ball bearings 132 shown, may be provided for rotatably mounting the car wheels 10 on the axle 130. The hub portion 133 of each car wheel 10 may be provided with a suitable bushing 134 having a flange 135 at the inner end thereof which engages a shoulder 136 on a sleeve 137 fixed to the axle, for the purpose of limiting the inward movement of the car wheel 10 along the axle.

Each rotary inertia device comprises a rotary inertia element or ring 139 rotatably mounted on the hub portion 133 of the car wheel 10 through the medium of ball bearings 141 and driven by rotation of the car wheel through a flexible resilient connection in the form of a leaf spring 142.

As shown clearly in Fig. 3, the inertia ring 139 is provided on the internal surface thereof with a peripheral groove indicated as semi-hexagonal in cross-section and concentrically disposed within the inertia ring 139 is another ring member 144 having a complementary peripheral groove of corresponding semi-hexagonal cross-section, the ball bearings 141 being received in the closed groove formed by the two registering grooves 143 and 145 through a transverse slot 146 in the inertia ring 139 and each ball bearing 141 being held in position by means of bifurcated or forked members 147 of L-shape secured to the inertia ring as by screws 148.

The ring 144 is fixed to a tubular member 149 through a cushioning ring 151 of suitable material, such as rubber, which is suitably bonded on the outer and inner surfaces thereof to the ring 144 and tubular member 149 respectively. The tubular member 149 is adapted to fit closely over the inner end of the hub portion 133 of the car wheel and to be secured thereto, as by screws 153, which extend through corresponding openings in a radial flange portion of the tubular member 149.

It should be observed that the inertia ring 139 is locked against axial movement with respect to the wheels 10 as well as being rotatively mounted thereon, by the ball bearings 141.

The inertia ring 139 is provided with a lug 154 which extends radially inward between the two spaced arms 155 of a yoke, only one of which arms is shown in Fig. 3, fixed to or integrally formed on the ring 144. The arrangement of the lug 154 and the yoke arms 155 on the ring 144 is such as to permit a limited maximum rotative movement of the inertia ring 139 relative to the ring 144 and the car wheel 10.

Suitably carried on the tubular member 149, at a portion of reduced diameter, is an insulating block 156 which may be fixed or secured to the tubular member 149 as by a plurality of bolts 157. The insulating block 156 has suitably secured therein a metallic U-shaped member 158 in which one end of the leaf spring 142 is slidably received, the other end of the leaf spring being riveted or otherwise suitably clamped between the flanges of two L-shaped brackets 161 fixed to the outer periphery of the inertia ring 139 in insulating relation thereto as by screws 162.

Carried by the insulating block 156 are a plurality of contact fingers, three contact fingers 163a, 164a, 165a, respectively being provided on one side and three contact fingers 163b, 164b and 165b, respectively on the opposite sides of the leaf spring 142.

Each contact finger is in the form of a bell crank lever pivoted at the fulcrum thereof on a pin 167 of insulating material, a coil spring confined in a suitable circular recess in the insulating block 156 urging an arm of the contact finger to a position limited by engagement with a stop screw 169. Suitable insulating washers or spacing rings 171 of insulating material are provided between the adjacent contact fingers on a pivot pin 167.

The stop screws 169 for the different contact fingers are adjusted to different positions so that normally the contact fingers in each group on opposite sides of the leaf springs are displaced successively increasing or decreasing distances from cooperating contact discs 172 fixed on the metallic leaf spring 142. When a car wheel is decelerated or accelerated, the inertia ring 139 tends to over-run or under-run the car wheel and consequently, depending upon the rate of deceleration or acceleration shifts rotatively relative to the car wheel different degrees, so that engagement of each of the contact discs 172 of the leaf spring 142 with a corresponding contact finger will accordingly take place at different rates of acceleration or deceleration. For example, referring to Fig. 1, if the car wheels 10 are rotating in a counterclockwise direction for forward motion of the car or train, the inertia ring 139 will tend to over-run its associated car wheel 10 in a counterclockwise direction and thus effect successive engagement of the leaf spring 142 with the contact fingers 163b, 164b and 165b located to the left of the leaf spring 142. The tension of the spring 142 and the adjustment of the contact fingers may be such, for example, that engagement of the contact finger 163b with the leaf spring 142 occurs at or above a rate of rotative deceleration of the vehicle wheel corresponding substantially to a rate of deceleration of the car of 4.4 miles per hour per second, engagement of the contact finger 164b with the leaf spring 142 occurs at or above a rate of rotative speed of deceleration of the car wheel corresponding substantially to a rate of retardation of the car of 5.5 miles per hour per second, and engagement of the contact finger 165b with the leaf spring 142 occurs at or above a rate of rotative deceleration of the car wheel 10 corresponding substantially to a rate of deceleration of the car of 7.7 miles per hour per second. It should be understood that the above figures used are illustrative only and that the adjustment of the contact fingers and the tension of the leaf spring 142 may be such that engagement of the leaf spring with the contact fingers occurs at any desired successive rates of rotative deceleration of the car wheel.

In a similar manner the adjustment of the contact fingers 163a, 164a, and 165a respectively is such that the flexing of the leaf spring 142 due to the shifting of the inertia ring 139 backwardly of its normal position with respect to the car wheel upon acceleration of the car wheel results in the successive engagement of the contact discs 172 on leaf spring 142 with the contact fingers 163a, 164a and 165a respectively at rates of rotative acceleration of the car wheel corresponding to 4.4, 5.5 and 7.7 miles per hour per second retardation of the car.

It should be understood that if the car wheel 10 is rotating in a clockwise direction upon deceleration of the wheel, then the contact fingers 163a, 164a and 165a are successively engaged according to the rate of deceleration of the wheel and the contact fingers 163b, 164b, 165b are successively engaged according to the rate of acceleration of the vehicle wheel.

As will be made apparent hereinafter, I provide electrical means under the control of the switches formed by the leaf spring 142 and the respective contact fingers associated therewith to control the degree of application of the brakes, that is, the brake cylinder pressure. In order to establish an electrical connection to the contact fingers 163a, 164a, 165a, 163b, 164b and 165b and to the leaf spring 142, four collector or slip rings 172, 173, 174 and 175 are mounted in insulated relation on the tubular member 149 in concentric relation to the axle 130. As will be seen in Fig. 3, the slip rings 172 to 175 are disposed side by side and provided at intervals with suitable bushings and spacers of insulating material through which bolts 176 extend for fastening the rings to a flange at the end of tubular member 149 that extends radially inward toward the axle 130.

The metallic member 158, in which the inner end of the flexible spring 142 is held, is connected to one of the slip rings, such as 172, by a suitably insulated wire 177.

Each contact finger is provided with a terminal strap or post 178 (see Fig. 4) fixed in the insulating block 156 and adapted to be engaged by the coil spring 168 which yieldingly urges the corresponding contact finger to its normal position. Short insulated wires 183, 184 and 185 connect the terminal strap 178 of contact fingers 163a, 164a and 165a to slip rings 173, 174 and 175, respectively. Similarly, short insulated wires 183, 184 and 185 connect the terminal straps of contact fingers 163b, 164b and 165b to slip rings 173, 174 and 175, respectively. Thus, corresponding contact fingers on opposite sides of the leaf spring are connected to each other by virtue of connection to the same slip ring.

Associated with the slip rings 172, 173, 174 and 175 is a brush holder 187 for supporting a plurality of brushes 192, 193, 194 and 195 in contact with the slip rings 172 to 175, respectively, in well known manner, the brush holder 187 being mounted stationarily as on a bracket 188 secured by screws 189 to a split ring 190 detachably secured in clamping relation around the sleeve 137 on the axle 131. Wires 202, 203, 204 and 205 are connected respectively to the brushes 192 to 195, each of the wires 202 to 205 being suitably insulated and preferably all bound together in a single unitary cable 206 leading into the brush holder 187.

Figure 2:
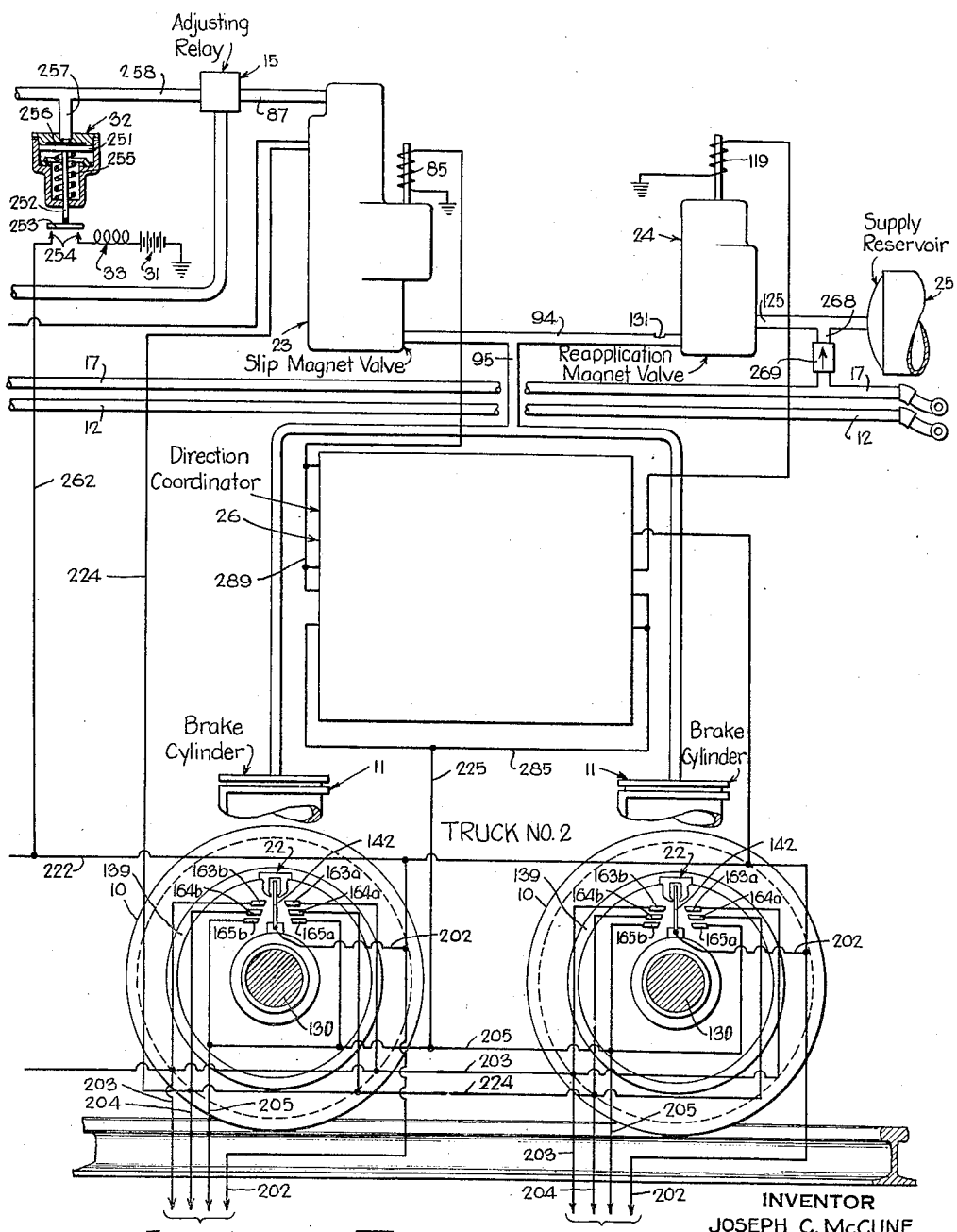

For simplicity and clarity, the wires 202, 203, 204 and 205 are shown in Figs. 1 and 2 as connected directly to the contact fingers 163a to 165a, 163b to 165b and leaf spring 142 without any representation of the slip rings 192 to 195 or brush holder 187.

A suitable casing 211 split into two portions having flanges adapted to meet and to be secured together substantially in a horizontal plane extending through the center line of the axle 130, as indicated at the right of Fig. 3, is provided for housing the inertia ring 139 and other parts of the rotary inertia devices 22. The two portions of the casing 211 may be secured to the hub portion of the car wheel 10 as by screws 212, in the manner shown in Fig. 3, in which case the casing 211 rotates with the car wheel, or the casing 211 may be suitably attached to the non-rotatable axle 130 in manner not shown, in which case the casing 211 does not rotate. In any case, the cable 206 containing the wires 202 to 205 extends out of the casing 211 preferably at the central opening 213 through which the axle 130 extends so as not to interfere with the rotation of the casing.

As indicated in Figs. 1 and 2 the rotary inertia devices 22 associated with all the wheels of truck No. 1 are connected in parallel relation and the rotary inertia devices of truck No. 2 are all connected in parallel relation, the wires 202, 203, 204 and 205 leading out of each rotary inertia device being connected to common wires 222, 223, 224 and 225, respectively.

The wires 222 and 223 are the same for both trucks No. 1 and No. 2, but each of the trucks has an individual wire 224 and 225. The purpose of this arrangement will be made apparent hereinafter.

The direction coordinators 26 for the wheel trucks No. 1 and No. 2 are identical in construction and operation and accordingly only the direction coordinator for wheel truck No. 1 is shown in detail and will be described. As previously indicated, the direction coordinator 26 comprises three electromagnetic relays or switch devices 27, 28 and 29. Relay 27 is illustrated diagrammatically as comprising an electromagnet winding 227 effective when energized to actuate an armature, illustrated in the form of a stem or plunger 228, from an upper position to which it is urged by a coil spring 229 to a lower position against the yielding resistance of the spring 229. Armature 228 carries in insulated relation thereon two contact members 231 and 232. Associated with the contact member 231 are two pairs of fixed contact members 231a and 231b, respectively, and associated with the contact member 232 are two pairs of contact members 232a and 232b, respectively. In the normal or upper position of the armature 228, the contact members 231 and 232 respectively engage the pairs of contact members 231a and 232a in circuit-closing contact. In the lower or actuated position of the armature 228, the contact members 231 and 232 disengage the associated contact members 231a and 232a and respectively engage the pairs of contact members 231b and 232b in circuit-closing contact.

The relay 28 comprises an electromagnet winding 234 effective, when energized, to actuate an armature indicated in the form of a plunger 235, from an upper position to which it is normally urged by a coil spring 236 to a lower or actuated position. The armature 235 carries in insulated relation thereon two contact members 237 and 238. Associated with the contact member 237 are a pair of fixed contact members 237a which are engaged by the contact member 237 only when the armature 235 is in its actuated position. Associated with the contact member 238 are a pair of fixed upper contact members 238a and a pair of fixed lower contact members 238b. In the normal position of the armature 235, the contact member 238 engages the contact members 238a in circuit-closing contact. In the actuated position of the armature 235 the contact member 238 disengages the contact members 238a and engages the contact members 238b in circuit-closing contact.

The relay 28 is of the slow pick-up type and to indicate this characteristic of the relay 28, a lag ring 239 is disclosed in associated relation with the armature 235 which functions to delay for a slight interval of time the movement of the armature 235 in response to the initial energization of the electromagnet winding 234. The purpose of the slow pick-up characteristic of relay 28 will be made clear hereinafter.

The relay 29 comprises an electromagnet winding 241 which is effective, when energized, to actuate an armature illustrated in the form of a stem or plunger 242, from a normal position to which it is urged by a coil spring 243 to a lower actuated position. The armature 242 carries in insulated relation thereon a contact member 244 which engages a pair of associated fixed contact members 244a when the armature is in its normal upper position and which disengages the contact members 244a and engages a pair of associated fixed contact members 244b when the armature is in its actuated position.

The various relays 27, 28 and 29 of the direction coordinator 26 are associated and related electrically in a manner to be more fully described hereinafter in connection with an assumed operation of the equipment. Briefly, however, the direction coordinator 26 is effective to cause the rotary inertia devices 22 associated therewith to always effect operation first of the slip magnet valve 23 and then of the reapplication magnet valve whether the vehicle wheels 10 are rotating in one direction or the other.

As indicated by the number of cells making up each of the batteries 30 and 31, the battery 30 has a higher voltage and current capacity than the battery 31. As will be explained more fully hereinafter, the synchronizing train wire is energized by current supplied from the battery 30, while the various electromagnet windings, particularly those under the control of rotary inertia devices 22, are energized by current supplied from the battery 31. As a practical matter, the battery 30 may have a terminal voltage of for example 32 volts whereas, the terminal voltage of the battery 31 may be of the order of 6 volts. It should be understood that while the batteries 30 and 31 are indicated as separate units, a single battery may be provided having suitable terminal connections to provide the desired supply voltages and current capacity of the two batteries 30 and 31.

The reason for providing a source of higher voltage for energizing the synchronizing train wire is to insure sufficient current for energizing the electromagnet winding of the relays 36, the synchronizing train wire being possibly of high resistance due to poor connections between cars. The reason for employing a source of lower voltage for energizing the electromagnet windings subject to the control of the rotary inertia devices 22 is to avoid the necessity for high current carrying capacity of the contact fingers of the rotary inertia devices as well as to minimize burning or pitting of the contact fingers due to arcing.

The pressure-operated switch 32 may be of any suitable construction and, as illustrated diagrammatically, may comprise a casing containing a piston 251 having a stem 252 carrying in insulated relation thereon a contact member 253, with which is associated a pair of fixed contact members 254. Interposed between the piston 251 and the casing is a coil spring 255 which normally urges the piston to a limited position in one direction in which the contact member 253 disengages its associated contact members 254. On the side of the piston 251 opposite the spring 255 is a chamber 256 which is connected through a branch pipe 257 to the fluid pressure supply pipe 258 leading to the two adjusting relays 15, which pipe 258 is in turn connected through a branch pipe 259 to the volume reservoir 18.

The strength of the spring 255 is such as to maintain the contact member 253 out of engagement with its associated contact members 254 until the pressure in the volume reservoir 18 effective in the chamber 256 on the piston 251 exceeds a certain low pressure, such as five pounds per square inch, after which the spring yields in response to the fluid pressure and permits movement of the piston 251 to effect engagement of the contact member 253 with its associated contact members 254. When the piston 251 is unseated downwardly from its normal position, the area thereof subject to the pressure in the volume reservoir 18 is suddenly increased and accordingly the contact member 253 is snapped into contact with its associated contact members 254.

The pressure switch 32 is provided for controlling the connection from one terminal of the battery 31, hereinafter called the positive terminal, to the wire 222 previously referred to and to which all of the wires 202 from the rotary inertia devices 22 are connected. As shown in Fig. 2, one of the contact members 254 of pressure switch 32 is connected to the wire 222 by a branch wire 262 and the other contact member 254 is connected to the positive terminal of the battery 31 by a wire 263 in which is interposed, in series relation, the inductance coil 33.

It will accordingly be seen that unless the pressure established in the volume reservoir 18 in response to the operation of the brake valve 14 exceeds the relatively low pressure of five pounds per square inch, no current can be supplied from the battery 31. With a pressure established in the volume reservoir 18 that is in excess of the five pounds per square inch, the contact member 253 of the pressure switch 32 connects the wires 262 and 263, thereby connecting the positive terminal of the battery 31 to the wire 222 and enabling current to be supplied from the battery 31.

The inductance coil 33 functions to delay for a slight interval of time, of the order of a fractional part of a second, the supply of current from the battery 31. The reason for such delay will be made apparent in the subsequent description of the operation of the equipment.

The relays 35 and 36 may be of any suitable construction including an electromagnet winding effective upon energization to actuate an associated contact-carrying armature. As indicated diagrammatically, the relay 35 may comprise an electromagnet winding 35a effective, when energized, to actuate an armature carrying in insulated relation thereon a contact member 35b to effect engagement of the contact member with a pair of associated contact members 35c. With the electromagnet winding 35a deenergized, the armature is biased by gravity or by spring means not shown to a normal position in which the contact member 35b disengages the contact members 35c. In a similar manner, the relay 36 comprises an electromagnet winding 36a effective, when energized, to actuate a contact member 36b into contact with a pair of associated fixed contact members 36c.

The supply reservoir 16 is connected to and charged with fluid under pressure from the main reservoir pipe 17 through a branch pipe 266 in which is included a one-way or check valve 267 for preventing back flow of fluid under pressure from the reservoir to the pipe. In a similar manner the two supply reservoirs 25 on each car are charged with fluid under pressure from the main reservoir pipe 17 through corresponding branch pipes 268 connecting the corresponding inlet pipes 125 for the reservoirs 25 and the main reservoir pipe 17, a one-way or check valve 269 being included in each of the pipes 268 for preventing back flow of fluid under pressure from the reservoirs. If desired a single large capacity supply reservoir may be provided instead of the three reservoirs. The provision of three separate reservoirs as shown avoids unnecessary long stretches of pipe, since the supply reservoirs 25 may be located at the respectively associated wheel trucks while, if only one reservoir is employed, it would be located midway between the two trucks at opposite ends of a car.

Operation (a). *Application of the brakes, including automatic regulation of rate of retardation*

Let it be assumed that the main reservoir 13 is charged to the normal pressure carried therein, as from a fluid compressor not shown, that all the supply reservoirs 16 and 25 on all of the cars are also correspondingly charged to the normal pressure carried therein, that the brake valve handle 41 is in its normal brake release position so that the brakes on the car or train are all released, that the car or train is traveling under power or coasting in the left-hand direction, as viewed in Figs. 1 and 2, so that the car wheels 10 rotate in a counterclockwise direction, and that the operator desires to effect an emergency application of the brakes.

To effect an emergency application of the brakes, the operator shifts the brake handle 41 out of its normal release position into its emergency position. Fluid under pressure is accordingly supplied from the main reservoir to the straight-air pipe 12 to establish the maximum pressure therein corresponding to the pressure in the main reservoir, fluid under pressure flowing from the straight-air pipe 12 through the branch pipe 53 on each car, past the unseated ball valve 45 of the cut-off magnet valve 19, through passage 54, pipes 55 and 56 to the volume reservoir 18 and thence by way of the pipes 259 and 258 to the pressure chambers of the relays 15. The relay 15 for wheel truck No. 1 is accordingly operated in response to the pressure established in the volume reservoir 18 to cause fluid under pressure to be supplied from the supply reservoir 16 through the supply pipe 87 past the unseated ball valve 81 of the slip magnet valve 23, through chamber 93, passage and pipe 94 and pipe 95 to the brake cylinders 11 associated with the forward and rear pairs of vehicle wheels 10 of truck No. 1, the relay 15 being automatically operative according to the setting thereof to establish a pressure in the brake cylinders 11 corresponding to the pressure established in the volume reservoir 18. In a similar manner, the relay 15 for the wheel truck No. 2 is operative in response to the pressure established in the volume reservoir 18 to cause fluid under pressure to be supplied from the supply reservoir 16 to the brake cylinders 11 of wheel truck No. 2, the pressure established in these brake cylinders being according to the pressure established in the volume reservoir 18 and according to the setting of relay 15. If the load carried by the two wheel trucks No. 1 and 2 is the same, the relays 15 for each truck will be set identically and accordingly the same pressure will be established in the brake cylinders 11 for both wheel trucks. If, however, the load carried by wheel truck No. 1 is greater than that carried by truck No. 2, then due to the different setting of the relay 15 for the truck No 1, the pressure established in the brake cylinders 11 of truck No. 1 will be correspondingly greater, although the pressure established in all brake cylinders is determined by the pressure established in the volume reservoir 18.

The pressure switch 32 is operated to connect the battery 31 to the wire 222, whenever the pressure in volume reservoir 18 exceeds the predetermined low value of five pounds per square inch. However, as will be apparent hereinafter, no current is supplied or drawn from the battery 31 unless one or more of the rotary inertia devices 22 associated with the car wheels 10 is operated sufficiently in response to the rotative retardation of the car wheels.

It will be apparent that all of the car wheels 10 will be rotatively decelerated at substantially the same rate in response to the application of the brakes effected by the supply of fluid under pressure to the brake cylinders 11.

Let it be assumed that the rate of rotative deceleration of the car wheels 10 effected by the application of the brakes attains a value corresponding for example to a rate of retardation of the car or train of 4.4 miles per hour per second so that the rotary inertia devices 22 associated with the different car wheels 10 of the two wheel trucks all respond to effect the engagement of the leaf spring 142 thereof with the contact finger 163b at substantially the same instant.

Since, as a practical matter, all inertia devices will not respond identically, let it be assumed that one of the rotary inertia devices 22, such as that associated with the car wheel 10 at the left-hand end of wheel truck No. 2 in Fig. 2, is the first to effect the engagement of the leaf spring 142 thereof with its contact finger 163b. In such case, a circuit is completed for energizing the electromagnet winding 58 of the cut-off magnet valve 19, this circuit extending from battery wire 222, connected to the positive terminal of the battery 31 as previously described, wire 202 leading to the inertia device 22 of the car wheel 10 at the left-hand end of truck No. 2 to the leaf spring 142 thereof and thence through the contact finger 163b and wire 203 leading out of the rotary inertia device, wire 223, electromagnet winding 58, to the negative terminal of the battery 31 through a ground connection in the manner indicated. As previously explained, the energization of the magnet winding 58 of the cut-off magnet valve 19 operates the double beat valve 57 to rapidly vent fluid under pressure from the back side of valve piston 47 to cause it to be shifted downwardly to effect the immediate seating of the ball valve 45 to cut off the further supply of fluid under pressure from the branch pipe 53 to the volume reservoir 18. Thus, notwithstanding that the pressure in the straight-air pipe 12 may continue to increase, no further fluid under pressure can be supplied from the straight-air pipe to the volume reservoir 18 unless the ball valve 45 is again unseated. The unseating of the ball valve 45 can only take place in the event that the magnet winding 58 is again deenergized, as subsequently described.

All of the rotary inertia devices 22 associated with all of the car wheels 10 are connected in parallel relation so that the engagement of the leaf spring 142 thereof with the corresponding contact finger 163b connects the battery wire 222 to the wire 223 leading to the electromagnet winding 58 of the cut-off magnet valve. It will thus be apparent that any one of the rotary inertia devices 22, depending upon which first completes the circuit, is adapted to energize the magnet winding 58 of the cut-off magnet valve 19 initially. Thus as those inertia devices 22, after the first, are operated to connect the battery wire 222 to the wire 223 a plurality of parallel circuits are established between the battery wire 222 and the wire 223 but the operation of any inertia devices after the first is without initiatory effect.

As is well known, the coefficient of friction between the brake shoes and the tread or other braking surface of the car wheels 10 increases as the speed of rotation of the car wheels decreases so that for a given pressure established in the brake cylinders 11, the rate of rotative deceleration of the car wheels 10 tends to increase after the cut-off magnet valve 19 on each car is operated to limit the pressure established in the volume reservoir 18 on the coresponding car.

When the rate of rotative deceleration of the car wheels 10 of either of the trucks No. 1 or No. 2 attains a value corresponding to a 5.5 miles per hour per second rate of retardation of the car or train, and the leaf spring 142 of one of the inertia devices 22 engages its associated contact finger 164b, a circuit is completed for energizing the synchronizing train wire 34. This circuit is not established directly under the control of the rotary inertia devices 22 but indirectly through the relay 35. Upon the engagement of the leaf spring 142 of one or more rotary inertia devices 22 with the contact finger 164b, a circuit is completed for energizing the magnet winding 35a of the relay valve 35, this circuit extending from the battery wire 222 through the wire 202 and leaf spring 142 of the first operated rotary inertia device to contact finger 164b thereof, thence through wires 204 and 224, contact members 90a and 90 of the slip magnet valve 23 for the corresponding truck, wire 275, magnet winding 35a and to the negative terminal of the battery 31 as through a ground connection in the manner indicated.

Upon the energization of the magnet winding of the relay 35, contact member 35b of the relay is actuated into engagement with the associated contact members 35b to connect one terminal of the battery 30, hereinafter referred to as the positive terminal, to the synchronizing train wire 34 through the simple connection shown in the upper left-hand corner of Fig. 1.

The magnet winding 36a of each of the relays 36 has one terminal thereof connected to the synchronizing train wire and the other terminal is connected to the negative terminal of the battery 30 as through a ground connection in the manner shown. Accordingly, all of the relays 36 on all of the cars throughout the train are simultaneously energized and actuated to circuit-closing position.

By the time that any one of the car wheels 10 attains a rate of rotative deceleration corresponding to retardation of the car or train at a rate of 5.5 miles per hour per second, all of the car wheels will have attained a rotative deceleration rate corresponding at least to 4.4 miles per hour per second retardation of the car or train. Thus upon the actuation of the relay 36 on each car to circuit-closing position, a circuit is established for energizing the magnet winding 77 of the release magnet valve 21 on each car, this circuit extending from the wire 223, which as previously explained is connected to the battery wire 222 through the contact fingers 163b and spring 142 of the rotary inertia devices 22, through a wire 277, contact members 36b and 36c of the relay 36, wire 278, magnet winding 77 of the release magnet valve 21, to the negative terminal of the battery 31 through a ground connection in the manner indicated.

As previously explained, the energization of the magnet winding 77 of the release magnet valve 21 causes the valve piston 66 of the release magnet valve 21 to be unseated to vent fluid under pressure from the volume reservoir 18 at a restricted rate determined by the size of the choke passage in the exhaust port 71. The volume reservoir 18 is of sufficient capacity, in relation to size of the choke passage of the exhaust port 71, as to cause the pressure in the volume reservoir 18 to be reduced gradually at a relatively slow rate to prevent over-reduction of the operating pressure for the relays 15.

As the pressure in the volume reservoir 18 on each car reduces under the control of the corresponding release magnet valve 21, the relays 15 for each of the wheel trucks Nos. 1 and 2 on each car are correspondingly operated to release fluid under pressure from the brake cylinders 11 in a reverse direction through the pipe 95, pipe and passage 94, past the ball valve 81 of the slip magnet valve 23, pipe 87 to atmosphere at the relay 15.

The reduction in the pressure established in the brake cylinders accordingly uniformly reduces the degree of application of the brakes on all of the car wheels 10 of all of the wheel trucks throughout the train. Accordingly, the rotary inertia devices 22 associated with the car wheels 10 respond promptly to the reduced degree of application of the brakes sufficiently to effect the disengagement of leaf spring 142 thereof from the contact finger 164b. When the rotary inertia devices 22 for all of the car wheels of all the wheel trucks on any one car have all operated so as to effect the disengagement of the leaf spring 142 thereof from the associated contact finger 164b, the circuit for energizing the magnet winding of the relay 35 on that car is interrupted. The relay 35 is accordingly actuated to circuit-opening position, thereby disconnecting the battery 30 from the synchronizing train wire 34.

The magnet windings 36a of all of the relays 36 will remain energized, however, as long as there are any rotary inertia devices 22 associated with any of the wheels throughout the train effective to maintain energization of the synchronizing train wire 34. When the relays 35 on all cars have been operated to disconnect the associated batteries 30 from the synchronizing train wire 34, all of the relays 36 are simultaneously actuated to circuit-opening position to interrupt the circuit for energizing the magnet winding 77 of the corresponding release magnet valve 21. As previously explained, the valve piston 66 of the release magnet valve 21 is promptly reseated in response to the deenergization of the magnet winding 77 to cut off the further venting of fluid under pressure from the volume reservoir 18 on the corresponding car.

It will thus be seen that the arrangement and circuit connections of the rotary inertia devices 22 associated with all of the car wheels is such as to prevent any car wheel from being rotatively decelerated at a rate in excess of 5.5 miles per hour per second, assuming of course that a wheel does not begin to slip—in which case a different operation occurs as will be explained hereinafter. It will accordingly be seen that the rotary inertia devices 22 operate automatically to regulate the rate of rotative deceleration of the car wheels 10 to a value corresponding to a rate of deceleration of the train somewhere between 4.4 miles per hour per second and 5.5 miles per hour per second. It will be apparent that such is the case because the instant that any one wheel 10 reaches a rate of rotative deceleration which is the equivalent of 5.5 miles per hour per second rate of retardation of train, the synchronizing train wire 34 is energized and a reduction of volume reservoir pressure effected so as to effect a corresponding reduction of pressure in the brake cylinders 11 associated with all of the car wheels throughout the train. During any one application of the brakes, the rotary inertia devices 22 may function repeatedly to energize the synchronizing train wire 34 and thus repeatedly reduce the pressure in the brake cylinders 11 to maintain a substantially uniform rate of rotative deceleration of the individual car wheels and consequently a substantially uniform rate of retardation of the train.

When the car or train has been brought to a complete stop in response to the application of the brake, the inertia ring 139 of every rotary inertia device 22 is restored to its normal position. Thus the circuit previously described for energizing the magnet winding 58 of the cut-off magnet valve 19 on each car under the control of the leaf spring 142 and contact finger 163b of each rotary inertia device on the corresponding car is interrupted and consequently the valve piston 47 is shifted upwardly to unseat the ball valve 45.

In view of the reduction in the initially established pressure in the volume reservoir 18 due to operation of the release magnet valve 21, the unseating of the ball valve 45 of cut-off magnet valve 19 on each car causes fluid under pressure to be again supplied from the straight-air pipe 12 to the volume reservoir 18 to rebuild the pressure therein to a pressure corresponding to that established in the straight-air pipe 12 and thus increase the degree of application of the brakes. With the car or train stopped however such increase of the degree of application of the brake is on the safe side since it is effective to hold the car or train more effectively against creepage on a grade.

In the foregoing operation it was assumed that the rotary inertia devices 22 function to regulate the rate of retardation of the wheels of the train during an emergency application of the brakes to a substantially uniform rate somewhere between 4.4 and 5.5 miles per hour per second. As a practical matter, the rotary inertia devices would not be effective during a service application of the brakes to regulate the rate of retardation of the car wheels because the degree of application of the brakes during a service application would not be sufficient to produce a rate of retardation of the train as high as 4.4 miles per hour per second, the rate at which it was here assumed the operation of cut-off magnet valve 19 was effected.

It should be understood, however, that if it is desired to regulate the rate of retardation of the train during a service application of the brakes, the rotary inertia devices may be designed so as to effect operation of the cut-off and release magnet valve devices 19 and 21 at lower rates of retardation of the train, such as 2.5 and 3.5 miles per hour per second, respectively.

(b). *Prevention of wheel-sliding*

In the foregoing hypothetical operation, it was assumed that none of the car wheels 10 slipped during the application of the brakes. It is now proposed to describe the manner in which the equipment operates in the event that a car wheel begins to slip during application of the brakes, whether it is an emergency or service application thereof.

Let it be assumed that an application of the brakes has been initiated, as previously described, and that the rotary inertia devices 22 are operating in the manner previously described to regulate the rate of retardation of the car wheels and consequently of the car or train to a substantially uniform rate according to the design, adjustment and setting of the rotary inertia devices, assumed for illustrative purposes in the present application to be between 4.4 and 5.5 miles per hour per second. Let it be further assumed that the car wheel 10 shown at the left-hand end of truck No. 1 begins to slip during the application of the brakes. As is well known, when a car wheel begins to slip it decelerates at an exceedingly fast rate, attaining values sometimes as great as twenty to twenty-five miles per hour per second momentarily. Thus, when the car wheel 10 has attained a rotative deceleration rate of 7.7 miles per hour per second, the increased displacement of the inertia ring 139 of the rotary inertia device associated with the wheel 10 further flexes the leaf spring 142 and causes it to engage the contact finger 165b. A circuit is thereby completed for energizing magnet windings 241 and 234, respectively, of the relays 29 and 28 of the direction coordinator 26 for the corresponding wheel truck, and also the magnet winding 85 of the slip magnet valve 23 for the corresponding wheel truck. This circuit extends from the battery wire 222 through the wire 282 to the leaf spring 142 of the rotary inertia device 22 associated with the slipping wheel 10, thence by way of the contact finger 165b, wire 285 leading out of the rotary inertia device 22, wire 225, a wire 285, contact members 232a and 232 of the relay 27 of the direction coordinator 26, a wire 286, magnet winding 241 of the relay 29, wires 287 and 288, contact members 238a and 238 of the relay 28, a wire 289, in parallel through magnet winding 85 of the slip magnet valve 23 and magnet winding 234 of relay 28, and to the negative terminal of the battery 31 as through a ground connection in the manner indicated.

Since the magnet winding 234 of the relay 28 and the magnet winding 85 of the slip magnet valve 23 are in parallel relation, they are accordingly simultaneously energized. Due to the slow pick-up characteristic of relay 28, as effected by the lag ring 239, the contact member 238 of relay 28 is not immediately actuated to interrupt the circuit for energizing the magnet winding 85 of the slip magnet valve 23, thus assuring full energization of the magnet winding 85 of the slip magnet valve 23 and of the magnet winding 234 of relay 28.

When the armature 235 of the relay 28 is shifted to its actuated position in response to the energization of the magnet winding 234, the circuit through the contact members 238 and 238a of the relay 28 is interrupted but, at the same time, a holding circuit is established by the engagement of the contact member 237 of relay 28 with its associated contact members 237a and, consequently, the magnet winding 234 of the relay 28 as well as the magnet winding 85 of the slip magnet valve 23 remains energized. The holding circuit for the magnet windings 234 and 85 extends from the battery wire 222 through contact members 231a and 231 of the relay 27, a wire 291, contact members 237a and 237 of relay 28, a wire 292, wire 289, in parallel through the magnet windings 234 and 85, and to the negative terminal of the battery 31 through the ground connection indicated. It should be understood that once the magnet winding 234 of relay 28 is fully energized, the armature 235 of the relay is shifted so positively and rapidly as to effect engagement of the holding circuit contact member 237 with contact members 237a, notwithstanding the momentary interruption of the circuit between the time that contact member 238 opens the circuit and contact member 237 establishes the holding circuit.

When the relay 29 is actuated in response to the energization of the magnet winding 241, it establishes a self-holding circuit which is the same as the energizing circuit therefor, previously traced, to the magnet winding 241 and thereafter through wires 287 and 288, contact members 244 and 244b of the relay 29, a resistor 295, to the negative terminal of the battery 31 as through a ground connection in the manner indicated. The resistor 295 is effective to reduce the current energizing the magnet winding 241 of the relay 29 to a value sufficient to maintain it in its actuated position without overheating the winding 241.

Upon the energization of the magnet winding 85 of the slip magnet valve 23, the valve piston 82 is shifted downwardly into seated relation on the annular gasket seat 108 and the chamber at the back of the valve piston 82 continues to be vented to atmospheric pressure by way of the passage 109, past the check valve 110, and through the exhaust port 106, the brake cylinder pressure effective in the chamber 93 on the upper face of the valve piston 82 pneumatically holding the valve piston 82 in seated position on the annular gasket seat 108 against the pressure of spring 91. It will thus be apparent that once magnet winding 85 is energized, the valve piston 82 is pneumatically maintained or "stuck" in its lower position so that the ball valve 81 is thereafter seated to prevent the further supply of fluid under pressure to the brake cylinders, under the control of the relay 15, from the supply reservoir 16. At the same time the disengagement of the contact member 90 on the stem 88 of the valve piston 82 from its associated contact members 90a prevents the energization of the magnet winding 35a of the relay 35 because it interrupts the energizing circuit previously described and established by the engagement by the leaf spring 142 with contact finger 164b of the rotary inertia device 22 associated with the slipping wheel. Accordingly, the undesired energization of the synchronizing train wire 34 is prevented when an individual car wheel slips.

It will be understood that current may be supplied momentarily to the magnet winding 35a because the leaf spring 142 engages the contact finger 164b of the rotary inertia device associated with the slipping wheel prior to its engagement with its associated contact finger 165b. Due, however, to the inherent operating lag of the relay 35, the contact member 35b thereof is not actually shifted to a position connecting the battery 30 to the synchronizing train wire before contact member 90 of the slip magnet valve is actuated to open the circuit for energizing the magnet winding 35a.

As pointed out in the previous description of the slip magnet valve 23, the energization of the magnet winding 85 is also effective to cause the unseating of the release valve piston 83 so that, substantially simultaneously with the seating of the ball valve 81 to prevent the supply of fluid under pressure therepast to the brake cylinders 11, release piston 83 is unseated to cause fluid under pressure to be rapidly vented from the brake cylinders 11 associated with the wheels of the truck having the slipping wheel, (here assumed to be truck No. 1) through the relatively large exhaust port 98 of the slip magnet valve 23.

The reduction of the pressure in the brake cylinders 11 of the wheel truck No. 1 having the slipping wheel is effected at such a rapid rate through the exhaust port 98 of the slip magnet valve 23 that the slipping wheel immediately responds to the decrease in the degree of application of the brakes, ceases to decelerate, and then accelerates at a rapid rate back toward a speed corresponding to the speed of the car or train.

When the slipping car wheel of truck No. 1 ceases to decelerate at a rate in excess of 7.7 miles per hour per second and the leaf spring 142 of the associated rotary inertia device 22 disengages the contact finger 165b, the holding circuit for the relay 29 of the direction coordinator 26 is interrupted. The relay 29 is accordingly returned to its normal position in which the contact member 244 thereof engages the contact members 244a. Since the magnet winding 234 of the relay 28 is still maintained energized by the holding circuit through the contact members 231 and 231a of the relay 27 as previously pointed out, the contact member 238 of the relay 28 remains in contact with its associated contact members 238b.

As is well known, when a slipping wheel returns back toward a speed corresponding to car or train speed, it accelerates very rapidly, in fact more rapidly than it decelerates at the time slipping is initiated. Accordingly, when the slipping wheel accelerates rotatively back toward a speed corresponding to car or train speed, it does so at a rate in excess of 7.7 miles per hour per second, so that the inertia ring 139 of the associated rotary inertia device 22 shifts backwardly of its normal position to effect engagement of the leaf spring 142 with the contact finger 165a. A circuit is thereby completed for energizing the magnet winding 227 of the relay 27, which circuit extends from the battery wire 222 through wire 202 leading into the rotary inertia device 22 associated with the slipping wheel, the leaf spring 142, contact member 165a, wires 205, 225 and 285, contact members 238b and 238 of the relay 28 of the direction coordinator 26, a wire 296, contact members 244 and 244a of the relay 29, a wire 297, a branch wire 298, magnet winding 227 of relay 27, and to the negative terminal of the battery 31 through a ground connection in the manner indicated.

The relay 27 is promptly shifted to its actuated position in response to the energization of its magnet winding 227. In shifting to its actuated position, the contact member 231 of the relay 27 disengages its associated contact members 231a and thus interrupts the holding circuit, previously traced, for the magnet winding 234 of the relay 28 and the magnet winding 85 of slip magnet valve 23. At the same time, in its actuated position, the contact member 231 engages the associated contact members 231b and thereby establishes a circuit connecting the magnet winding 119 of the reapplication magnet valve 24 in parallel with the magnet winding 227 of the relay 27, which winding 119 is thus promptly energized.

When magnet winding 85 of slip magnet valve 23 is deenergized, the release valve piston 83 is instantly restored to seated position closing the exhaust port 96 and further release of fluid under pressure from the brake cylinders 11 is thus instantly stopped. As previously pointed out, however, the valve piston 82 is maintained pneumatically held or "stuck" in its lower seated position, and thus ball valve 81 remains effective to prevent the further supply of fluid under pressure from supply reservoir 16 to the brake cylinders 11 under control of relay 15 except as hereafter to be described.

In its actuated position, the contact member 232 of the relay 27 engages the associated contact members 232b and thereby connects the wire 285 to the wire 297, thus establishing a holding circuit for maintaining the magnet winding 227 of the relay 27 energized thereafter independently of relay 28. Thus, notwithstanding that the relay 28 returns to its normal position in response to the deenergization of the magnet winding 234, the consequent separation of the contact member 238 of relay 28 from its associated contact members 238b does not effect deenergization of the magnet winding 227 of the relay 27. Furthermore, due to the separation of the contact member 232 of the relay 27 from its associated contact members 232a, the return of the contact member 238 of the relay 28 into engagement with its associated contact members 238a is not effective to reestablish the circuit for energizing the magnet winding 85 of the slip magnet valve and the magnet winding 234 of the relay 28.

It should thus be apparent that as long as the slipping wheel accelerates rotatively back toward car or train speed at a rate in excess of 7.7 miles per hour per second, that is, a rate sufficient to maintain the leaf spring 142 engagement with its contact member 165b, the relay 27 will be maintained in its actuated position and accordingly the magnet winding 119 of the reapplication magnet valve 24 will be correspondingly energized.

As previously explained in the description of the reapplication magnet valve 24, the energization of the magnet winding 119 thereof instantly effects the unseating of the valve piston 116, and fluid under pressure is accordingly resupplied to the brake cylinders 11 of truck No. 1 from the corresponding supply reservoir 25. Since the supply reservoir 25 is charged to main reservoir pressure and has adequate capacity for a maximum brake application, the reapplication of the brakes on the slipping wheel and the other wheels of the same truck is positively assured.

It should be noted that the ball valve 81 of the slip magnet valve 23 remains seated and thus continues to prevent the supply of fluid under pressure from the supply reservoir 16, under control of relay 15. The reason for preventing the supply of fluid under pressure to the brake cylinder under the control of relay 15 is that relay 15 does not have sufficient capacity nor is it sufficiently rapid to cause an adequate restoration of pressure in the brake cylinder during the short interval of time that the slipping wheel exceeds a rate of 7.7 miles per hour per second. Thus reapplication magnet valve 24, which is of large capacity and which operates very rapidly, is provided for this purpose.

As long as the slipping car wheel accelerates back toward a speed corresponding to car or train speed at a rate in excess of that required to maintain the leaf spring 142 in contact with the contact finger 165a, here assumed to be 7.7 miles per hour per second, fluid under pressure is accordingly resupplied to the brake cylinders 11 on the truck having the slipping wheel, under the control of the corresponding reapplication magnet valve 24. When the slipping wheel begins to accelerate back toward train speed at a rate less than 7.7 miles per hour per second, the consequent disengagement of leaf spring 142 from contact finger 165a interrupts the holding circuit for the magnet winding 119 of the reapplication magnet valve 24 and magnet winding 227 of relay 27 which are thus promptly deenergized. The valve piston 116 of the reapplication magnet valve 24 is thus instantly reseated to close off the further supply of fluid under pressure to the brake cylinders 11 from reservoir 25.

The choke 131 in the pipe 94 controls the rate of resupply of fluid under pressure to the brake cylinders 11 sufficiently, in relation to the rate of reduction of pressure effected through the exhaust port 96 of the slip magnet valve 23, that the pressure reestablished in the brake cylinder is less than the pressure originally established in the brake cylinders and which initiated the slipping of the wheel.

The pressure reestablished in the brake cylinders 11 of the wheel truck having a slipping wheel is also less than that which initiated the slipping of the wheel for the reason that the release valve piston 83 of the slip magnet valve 23 continues unseated and thus vents fluid under pressure from the brake cylinders from the time that a wheel begins to slip until it attains a rotative acceleration rate of 7.7 miles per hour per second, whereas the resupply of fluid under pressure to the brake cylinders 11 is effected only during the lesser time interval that the slipping wheel accelerates rotatively at a rate in excess of 7.7 miles per hour per second. Accordingly, the pressure reestablished in the brake cylinders is appreciably lower than that which initiated the slipping of the wheel and, consequently, the likelihood that slipping of the wheels will again occur during the application of the brakes is minimized.

It will be apparent that with the deenergization of the magnet winding 227 of the relay 27 in response to the decrease in the acceleration rate of the slipping wheel below 7.7 miles per hour per second, the relays 27, 28 and 29 of the direction coordinator 26 are all restored to the normal condition thereof in readiness for a subsequent operation thereof.

It will also be apparent that by so arranging the operation and interrelation of the relays 27, 28 and 29 of the direction coordinator 26 as to cause the magnet winding 85 of the slip magnet valve 23 to be energized continuously, once a vehicle wheel with which the slip magnet valve is associated begins to slip, until the slipping wheel accelerates rotatively at a rate in excess of 7.7 miles per hour per second, the ultimate release of the brakes on a slipping wheel is positively assured. This is so because if, in spite of all the control equipment provided, a vehicle wheel should slip sufficiently as to actually attain a locked-wheel or sliding condition, the continued release of the fluid pressure from the brake cylinder will ultimately reduce the application of the brakes sufficiently as to cause the sliding wheel to begin to accelerate and thus permit only momentary sliding of the wheel.

The distinguishing characteristic of my present invention over the equipment disclosed in my prior Patent 2,132,959 is that a positive acceleration of the slipping wheeel at a rate in excess of a certain rate is required to terminate the automatic venting of fluid under pressure from the brake cylinders associated with the truck having the slipping wheel. In my prior patent, the release of fluid under pressure from the brake cylinder or cylinders applying the brakes on a slipping wheel is cut off whenever the slipping wheel begins to decelerate at a rate less than a certain rate, without requiring a positive acceleration of the slipping wheel at a rate in excess of a certain rate as in my present invention. It will accordingly be seen that my present invention provides protection against continued sliding of a car wheel not offered by the equipment disclosed in my prior patent.

*(c). Duo-directional characteristic of brake control*

In the above description of the operation of my invention in connection with an assumed wheel-slipping operation, it was assumed that the car wheel was rotating in a counterclockwise direction. Conceivably, the car might be so located and positioned in a train that the wheels of the trucks No. 1 and 2 rotate in a clockwise direction. In such case, it should be apparent that upon the deceleration of a slipping wheel, the inertia ring 139 of the rotary inertia device 22 associated with the slipping wheel will shift in a clockwise direction, as seen in Fig. 1, for deceleration of the wheel and in a counterclockwise direction for acceleration of the wheel. Thus, instead of the leaf spring 142 contacting the contact members 165b and 165a, in the order named, it will contact the contact members 165a and 165b, in the order named, while the wheel is slipping. The relation and the connection of the relays 27, 28 and 29 of the direction coordinator 26 is such, however, as to always cause the energization of the magnet winding 85 of the slip magnet valve 23 upon deceleration of the wheel and the energization of the magnet winding 119 of the reapplication of the magnet valve 24 upon acceleration of the slipping wheel. It will be apparent that such is the case because contact members 165b and 165a of the rotary inertia device 22 are connected together electrically, the direction coordinator responding to the initial engagement of the leaf spring 142 with either of the contact fingers 165b to 165a to energize the magnet 85 of the slip magnet valve and responding upon the second engagement of the leaf spring 142 with either of the contact members 165b or 165a to effect deenergization of the magnet winding 85 and energization of the magnet winding 119. Accordingly, it makes no difference which way a car wheel 10 is rotating, that is, in a counterclockwise direction or clockwise direction, when it begins to slip, the direction coordinators 26 functioning in any case solely on a basis of the closing of two switches in succession.

This arrangement of the rotary inertia devices and the direction coordinator is such that three slip rings only are required for the six contact fingers associated with the leaf spring 142 of the rotary inertia devices instead of six as required in the arrangement shown in my prior Patent 2,132,959.

When the car or train comes to a complete stop in response to the application of the brakes, the fact that the valve piston 82, of the slip magnet valve 23 associated with a wheel truck on which a wheel slips during the application of the brakes, remains pneumatically held in its lower seated position causing the ball valve 81 to be seated, prevents the automatic resupply of fluid under pressure from supply reservoir 16 to the brake cylinders 11 of the corresponding truck. As previously pointed out the automatic return of the inertia ring 139 of every rotary inertia device 22 to its normal position when the car or train is completely stopped interrupts the circuit for energizing the magnet winding 58 of the cut-off magnet valve 19 on every car and, consequently, the pressure in the volume reservoir 18 is restored from the straight-air pipe 12 to that corresponding to the position of the brake valve handle 41 due to the unseating of the ball valve 45. Accordingly, it will be seen that if during the application of the brakes one or more of the wheels on a wheel truck slip, the seated ball valve 81 of the slip magnet valve 23 corresponding to that truck prevents the supply of fluid under pressure to the brake cylinders 11 under the control of the corresponding relay 15 which is operated in response to that increase of pressure in the volume reservoir 18.

It should be seen that while the brakes may be released and reapplied on all the wheels of a wheel truck, of which one wheel slips during the application of the brakes, the wheels of other wheel trucks on which no wheel slips during the application of the brake will be regulated in the normal manner by the rotary inertia devices 22 operating to regulate the rate of rotative retardation of the wheels to a substantially uniform rate.

*(d). Release of the brakes*

When it is desired to release the brakes on all wheel trucks, including those on which a wheel may have slipped during the application of the brakes, it is necessary for the operator only to shift the brake valve handle 41 to its normal brake release position. When the pressure in the volume reservoirs 18 is reduced under the control of the brake valve 14, the relays 15 controlled thereby operate in a manner to release fluid under pressure from the brake cylinders 11. If one or more wheels of a given wheel truck have slipped during the application of the brakes, the ball valve 81 of the corresponding slip magnet valve 23 remains seated against the upward force of brake cylinder pressure effective in the chamber 93 on the ball valve 81, until sufficient reduction of pressure in chamber 86 has been effected by the relay 15 to permit the ball valve to unseat. Accordingly, fluid under pressure does not begin to be released from the brake cylinders 11 on a truck having a wheel which slipped, until the pressure in the chamber 86 above the ball 81 of the slip magnet valve associated with such truck reduces below brake cylinder pressure. When this occurs, the ball valve 81 is unseated upwardly by the higher brake cylinder pressure and exhausted to atmosphere through the exhaust port of the relay 15.

The valve piston 82 of the slip magnet valve 23 associated with a truck on which a wheel slips during an application of the brakes remains held seated on the annular gasket seat 108, as previously explained, notwithstanding the deenergization of the magnet winding 85 of the slip magnet valve. When the brake cylinder pressure in the chamber 93 acting to maintain the valve piston 82 seated is reduced sufficiently, the spring 91 again becomes effective to restore the valve piston 82 to its upper seated position on the annular rib seat 89 and the stem 88 of the valve piston is accordingly shifted upwardly to again maintain the ball valve 81 unseated and reengage the contact member 90 with its associated contact members 90a, thereby reconditioning the slip magnet valve 23 for subsequent operation.

(e). Protection against undesired operation

It is possible that, due to impact and shocks to the cars, as during switching operations, the rotary inertia devices 22 may be accidentally operated, that is, the inertia ring 139 of a rotary inertia device may be accidentally shifted out of its normal position sufficiently to effect engagement of the leaf spring 142 with one or more of the contact fingers 163a, 163b, 164a, 164b, 165a and 165b.

If the brakes are released at the time of impact or shock, no harm is done because pressure switch 32 is open and prevents the supply of current of battery 31 under the control of the rotary inertia device. If the brakes are applied, however, at the time of impact or shock, the undesired engagement of leaf spring with any of the contact fingers 164a, 164b, 165a and 165b would result in the undesired operation of the release magnet valve 21 or the slip magnet valve 23 to release the brakes. Furthermore, since the piston valve 82 of the slip magnet valve 23 is pneumatically "stuck" in its lower position, once the slip magnet valve is operated, the brakes would be prevented from reapplying by the seated ball valve 81 without first releasing the brakes on the train.

In order to prevent such undesired operation, the choke or inductance coil 33 is provided in the supply from battery 31. Choke 33 opposes the initial flow of current from battery 31 in response to the engagement of a leaf spring 142 with any of its associated contact fingers. Thus, unless a leaf spring 142 engages an associated contact finger longer than momentarily in an intended manner, insufficient current will flow to pick up any of the various electromagnet windings controlled by the rotary inertia devices. Thus undesired and unintended operation of the brake control equipment will not occur.

SUMMARY

Summarizing, it will be seen that I have provided a brake control equipment for a car or train including a rotary inertia device associated individually with each car wheel and a system of electrically controlled valves and relays effective in response to the operation of the rotary inertia devices to so regulate the application of the brakes on the wheels as to cause the car or train to decelerate at a substantially uniform rate. The rotary inertia devices associated with the car wheels are also adapted to cause a rapid release of the brakes on the wheels of a truck having a slipping wheel or wheels and the automatic restoration of the application in response to the positive acceleration of the slipping wheel or wheels back toward a speed corresponding to car speed at a rate in excess of a certain rate. A distinguishing feature of my present invention as compared to my prior Patent 2,132,959 is that once a car wheel begins to slip, the automatic release of fluid under pressure from the brake cylinder applying the brakes on the slipping wheel is continued thereafter until the slipping wheel exceeds a certain positive acceleration rate at which time the automatic release of fluid under pressure from the brake cylinders is cut off and resupply of fluid under pressure to the brake cylinders initiated. Thus in the event that a car wheel actually does slide, it can do so only momentarily since the release of the brakes continues to take place until the wheel positively accelerates at a rate in excess of a certain rate.

The brake control equipment is such as to control the brakes of a wheel truck having a slipping wheel individually and preventing the slipping wheel from affecting the brakes on other wheel trucks having no slipping wheel so that the application of brakes on trucks having no slipping wheels is continued undiminished at the rate determined by the rotary inertia devices thereon. Accordingly protection against sliding of the wheels is provided without materially lengthening the stopping distance because the application of the brakes is continued to an undiminished degree of all wheel trucks having no slipping wheels.

A direction coordinator of novel construction is provided for automatically effecting the operation of the brake control equipment during a wheel slip condition for either direction of the rotation of the car wheels, that is, whether a car is traveling in a forward or a backward direction. The direction coordinator so cooperates with the rotary inertia devices associated with the car wheels as to always cause first the release of the brakes upon deceleration of the slipping wheel and then reapplication of the brakes upon acceleration of the slipping wheel. The rotary inertia devices are adapted to close switch devices whenever the rate of deceleration or acceleration of the slipping wheel exceeds a certain rate. These switch devices are connected in parallel and the direction coordinator is always responsive to the first switch closed to release the brakes and to the second switch closed to reapply the brakes.

The brake control equipment includes means for guarding against undesired operation of the brake control equipment in response to undesired operation of the rotary inertia devices caused by shocks to the cars. This means is illustrated in the form of an inductance coil in the circuits controlled by the rotary inertia devices for momentarily delaying the build-up of current in response to the accidental closure of switches by the rotary inertia devices. Since the switches of the rotary inertia devices are closed only momentarily if the operation thereof is accidental, the delay of current flow in the circuit controlled by the accidentally closed switches prevents the undesired operation of the brake control equipment.

The rotary inertia devices are furthermore of novel construction in that a rotary inertia element is driven from a vehicle wheel through a leaf spring which in turn forms a part of the electrical circuit controlled by the rotary inertia device. Thus, if the leaf spring forming a driving connection between the wheels and the rotary inertia element of the rotary inertia devices is broken, the electrical control of the rotary inertia device is destroyed and consequently no undesired operation due to the brakage of the spring connection can occur.

While I have shown and described a specific embodiment of my invention, it will be apparent that various omissions, additions or modifications may be made without departing from the spirit of my invention. It is accordingly not my intention to limit the scope of my invention except as it is necessitated by the scope of the prior art.

Having now described my invention, what I claim as new and desire to secure by Letters Patent, is:

1. In a brake system for a car or train, in combination, means for effecting application and release of the brakes throughout the car or train, means operated automatically during an application of the brakes in response to the rotative deceleration of a car wheel at a rate in excess of a certain rate for initiating release of the brakes associated with the said wheel, and means operated automatically during an application of the brakes in response to the rotative acceleration of the said wheel at a rate in excess of a certain rate for terminating the release of the brakes associated with said wheel and effective to cause continued reapplication of the brakes associated with said wheel to an increasing degree only as long as the said wheel accelerates at a rate in excess of the second said certain rate.

2. In a fluid pressure brake equipment for a car or train, in combination, a brake cylinder effective upon the supply of fluid under pressure thereto to effect application of the brakes associated with a car wheel and upon the venting of fluid pressure therefrom to effect the release of the brakes, manually controlled means for effecting the supply of fluid under pressure to and the venting of fluid under pressure from the brake cylinder, means operated automatically during an application of the brakes in response to the rotative deceleration of said wheel at a rate in excess of a certain rate for initiating the venting of fluid under pressure from the said brake cylinder, and means operated automatically during an application of the brakes in response to the rotative acceleration of the said wheel at a rate in excess of a certain rate for terminating the venting of fluid under pressure from the brake cylinder and effective to cause fluid under pressure to be resupplied to the brake cylinder only as long as the said wheel rotatively accelerates at a rate in excess of the second said certain rate.

3. In a brake system for a car or train, manually controlled means for effecting application and release of the brakes associated with the wheels of the car or train, means operated automatically during an application of the brakes in response to the rotative deceleration of a slipping wheel at a rate in excess of a certain rate for initiating the release of the brakes from the said wheel, and means operated automatically in response to the rotative acceleration of the slipping wheel at a rate in excess of a certain rate to terminate the release of the brakes and cause continued reapplication of the brakes to an increasing degree only as long as the slipping wheel accelerates at a rate in excess of the second said certain rate.

4. In a fluid pressure brake system for a car or train, in combination, a brake cylinder effective upon the supply of fluid under pressure thereto to cause application of the brakes and upon the venting of fluid under pressure therefrom to cause release of the brakes associated with a car wheel, manually controlled means for causing fluid under pressure to be supplied to and released from the brake cylinder, means operated automatically during an application of the brakes in response to the rotative deceleration of the said car wheel at a rate in excess of a certain uniform rate while slipping for initiating the venting of fluid under pressure from the brake cylinder, and means operated automatically in response to the rotative acceleration of the slipping wheel back toward a speed corresponding to car speed at a rate in excess of a certain uniform rate for terminating the venting of fluid under pressure from the brake cylinder and effective to cause fluid under pressure to be resupplied to the brake cylinder only as long as the said car wheel accelerates at a rate in excess of the second said uniform rate.

5. In a brake system for a car or train having manually controlled means for causing application and release of the brakes associated with a car wheel, rotary inertia means rotatable with the car wheel, said inertia means having a normal position with respect to said wheel and shiftable rotatively forward and backward from said normal position to different degrees according to the rate of deceleration and acceleration respectively of said wheel, means operative during an application of the brakes in response to the shifting of said inertia element forwardly of its normal position a certain degree for initiating the release of the brakes associated with said wheel, and means operative in response to the shifting of said inertia element backwardly of its normal position to a certain degree for terminating the release of the brakes and effective to cause reapplication of the brakes associated with said wheel to an increasing degree only as long as the inertia element is displaced rotatively at least said certain degree backwardly of its normal position.

6. In a fluid pressure brake system for a car or train having a brake cylinder effective upon the supply of fluid under pressure thereto to cause application of the brakes associated with a car wheel and upon the venting of fluid under pressure therefrom to cause the release of the brakes, the combination of rotary inertia means rotatable with said car wheel, said inertia means having a normal position with respect to said wheel and shiftable rotatively forward and backward from said normal position to different degrees according to the rate of rotative deceleration and acceleration respectively of said car wheel, means operative during an application of the brakes in response to the shifting of said inertia means forwardly of its normal position a certain degree for initiating the venting of fluid under pressure from the brake cylinder, and means operative during an application of the brakes in response to the shifting of said inertia element backwardly of its normal position a certain uniform degree for terminating the venting of fluid under pressure from the brake cylinder and for causing fluid under pressure to be resupplied to the brake cylinder to effect an increasing pressure therein as long as the inertia element is displaced rotatively at least said certain uniform degree backwardly of its normal position.

7. In a brake system for a car or train having manually operated means for causing application and release of the brakes associated with all the car wheels, the combination of rotary inertia means rotatable with a car wheel, said inertia means having a normal position with respect to said wheel and shiftable rotatively at least a certain degree forwardly out of its said normal position in response to the rotative deceleration of the said wheel while slipping and shiftable rotatively backward at least a certain degree out of its normal position in response to the rotative acceleration of the said slipping wheel in returning back toward a speed corresponding to car speed, means operative during an application of the brakes in response to the shifting of said inertia element forwardly of its normal position at least said certain degree for initiating the release of the brakes associated with said wheel, and means operative during an application of the brakes in response to the shifting of said inertia element backwardly of its normal position at least said certain degree for terminating the release of the brakes associated with the slipping wheel and for causing reapplication of the brakes on the said wheel to an increasing degree as long as the inertia element is displaced rotatively backward out of its normal position at least said certain degree.

8. In a fluid pressure brake system for a car or train having a brake cylinder effective upon the supply of fluid under pressure thereto to cause application of the brakes associated with a car wheel and upon the venting of fluid under pressure from said brake cylinder to effect the release of brakes from the said wheel and manually operative means for controlling the supply of fluid under pressure to and the release of fluid under pressure from the brake cylinder, the combination of rotary inertia means rotatable with said wheel, said inertia means having a normal position with respect to said wheel and shiftable rotatively forward out of its normal position at least a certain uniform degree in response to the rotative deceleration of the said wheel while slipping and shiftable rotatively backward out of its normal position at least a certain uniform degree in response to the rotative acceleration of the said wheel back toward a speed corresponding to car speed, means operative during an application of the brakes in response to the shifting of said inertia element forwardly out of its normal position at least said certain uniform degree for initiating the release of fluid under pressure from the brake cylinder, and means operative during an application of the brakes in response to the shifting of said inertia element backwardly out of its normal position at least said certain uniform degree for terminating the release of fluid under pressure from the brake cylinder and for causing the resupply of fluid under pressure to the brake cylinder to effect an increasing pressure therein only as long as the inertia element is displaced rotatively backward out of its normal position at least said certain uniform degree.

9. In a fluid pressure brake system for a car or train, the combination of a brake cylinder effective upon the supply of fluid under pressure thereto to cause application of the brakes associated with a car wheel and upon the venting of fluid under pressure therefrom to effect the release of the brakes, means providing a first communication through which fluid under pressure may be supplied to and released from the brake cylinder, manually controlled means for causing fluid under pressure to be supplied to the brake cylinder through said communication and released from said brake cylinder through said communication, a supply valve in said communication normally permitting the supply of fluid under pressure through the communication to the brake cylinder and operative to a position to prevent the supply of fluid under pressure to the brake cylinder, a normally closed release valve in said communication between said valve and the brake cylinder effective when opened to release fluid under pressure from the brake cylinder, means operative in response to the rotative deceleration of the said wheel at a rate in excess of a certain rate for effecting operation of the said valve to prevent the further supply of fluid under pressure through the said communication to the brake cylinder and operation of the said release valve to release fluid under pressure from the brake cylinder, means providing a second communication separate from the first said communication through which fluid under pressure may be supplied to the brake cylinder, valve means controlling the supply of fluid under pressure through said second communication, and means operative in response to the rotative acceleration of the said wheel at a rate in excess of a certain rate for effecting operation of the said release valve to its normal closed position to cut off the release of fluid under pressure from the brake cylinder and to cause operation of said valve means to supply fluid under pressure to the brake cylinder through the second communication only as long as the said wheel accelerates rotatively at a rate in excess of a certain rate.

10. In a fluid pressure brake system for a car or train, the combination of a brake cylinder effective upon the supply of fluid under pressure thereto to cause application of the brakes associated with a car wheel and upon the venting of fluid under pressure therefrom to cause the release of the brakes, manually controlled means for causing fluid under pressure to be supplied to and released from the brake cylinder through said communication, rotary inertia means associated with said car wheel and operatively responsive according to the rate of deceleration and acceleration of the wheel, valve means controlled by the rotary inertia means and operative when the rate of rotative deceleration of the said wheel exceeds a certain rate for preventing the supply of fluid under pressure thereafter through said communication to the brake cylinder and for releasing fluid under pressure from said communication and the connected brake cylinder, said valve means being operative under the control of said rotary inertia means to terminate the release of fluid under pressure from the brake cylinder only after the said wheel accelerates rotatively at a rate in excess of a certain rate, means providing a second communication through which fluid under pressure may be supplied to the brake cylinder independently of the first said communication, a valve device controlling the supply of fluid under pressure through said second communication to the brake cylinder, and means controlled by the rotary inertia means for effecting operation of the valve device to supply fluid under pressure to the brake cylinder only as long as the rate of rotative acceleration of the said wheel exceeds said certain rate.

11. A valve mechanism comprising a casing having a communication through which fluid under pressure may be supplied, a check valve in said communication effective when seated to prevent the flow of fluid under pressure through said communication in one direction and when unseated to permit the flow of fluid under pressure through said communication in both directions, fluid pressure responsive means effective normally when subject on opposite sides to the pressure of the fluid in said communication to unseat the said check valve and operative upon the reduction of fluid pressure on one side thereof to cause seating of the check valve, a normally seated release valve subject on opposite sides to the pressure in said communication and operative upon the reduction of fluid pressure on one side thereof to an unseated position wherein it causes fluid under pressure to be released from the said communication, a control valve normally effective to establish communication through which fluid under pressure is supplied from the said communication to the said one side of the fluid pressure responsive means and to the said one side of the release valve and operative to another position to simultaneously release fluid under pressure from the said one side of the fluid pressure responsive means and of the release valve, a communication between the said one side of the fluid pressure responsive means and the said one side of the release valve, and a one-way valve in the last said communication for preventing the supply of fluid under pressure through said communication from the one side of the release valve to the said one side of the fluid pressure responsive means whereby upon restoration of the said control valve to its normal position fluid under pressure is resupplied to said one side of said release valve but not to the said one side of the fluid pressure responsive means, thereby causing said release valve to be reseated without permitting the fluid pressure responsive means to unseat the said check valve.

12. In a fluid pressure brake system for a car or train having a brake cylinder to which fluid under pressure is supplied to cause application of the brakes associated with a car wheel and from which fluid under pressure is vented to cause the release of the brakes, the combination of two sources of fluid under pressure, manually operative means for effecting the supply of fluid under pressure from one of said sources to the brake cylinder to effect application of the brakes on the said wheel, means operative in response to the rotative deceleration of the car wheel while slipping for preventing the further supply of fluid under pressure from the said one source to the brake cylinder and for releasing fluid under pressure from the brake cylinder, and means operative in response to the rotative acceleration of the slipping wheel back toward a speed corresponding to car speed for terminating the release of fluid under pressure from the brake cylinder and for effecting a resupply of fluid under pressure to the brake cylinder for said second source only as long as the rate of rotative acceleration of the car wheel exceeds a certain uniform rate.

13. In a fluid pressure brake system for a car or train having a plurality of individually rotatable wheels, the combination of a plurality of brake cylinders operative upon the supply of fluid under pressure thereto to effect the application of the brakes to said wheels and upon the venting of fluid under pressure therefrom to release the brakes, manually operative means for effecting the supply of fluid under pressure to and the venting of fluid under pressure from all of said brake cylinders simultaneously, means operative in response to the rotative deceleration of any one of said wheels at a rate in excess of a certain rate while slipping for effecting a rapid venting of fluid under pressure from all of said brake cylinders, and means operative in response to the rotative acceleration of any one of said wheels at a rate in excess of a certain rate when returning to a speed corresponding to car speed while slipping for terminating the venting of fluid under pressure from said brake cylinders and causing fluid under pressure to be resupplied thereto.

14. In a brake system for a vehicle having a plurality of wheels separately and individually rotatable, the combination of brake means operative to effect application and release of the brakes associated with all of said wheels, manually operated means for controlling said brake means, a rotary inertia device for each of said vehicle wheels, each of said rotary inertia means being rotatable with a corresponding wheel, each of said inertia means having a certain normal position with respect to the corresponding wheel and shiftable forwardly out of its normal position at least a certain degree in response to the deceleration of the wheel while slipping and shiftable backwardly out of its normal position at least a certain degree in response to the rotative acceleration of the slipping wheel back toward a speed corresponding to vehicle speed, means operative during an application of the brakes in response to the shifting of the inertia means associated with any of said wheels at least said certain degree forwardly out of its normal position for effecting operation of the brake means to release the brakes from all of said wheels, and means operative in response to the shifting of the inertia means associated with any of said wheels backwardly out of its normal position at least said certain degree for effecting the operation of the brake means to effect reapplication of the brakes on all the wheels.

15. In a fluid pressure brake system for a car or train having a plurality of individually rotatable wheels, the combination of a plurality of brake cylinders for effecting application of the brakes on all of said wheels according to the degree of pressure established therein, manually operative means for controlling the pressure established in said brake cylinders to effect the desired degree of application of the brakes on said wheels, means operatively responsive to the rate of rotative deceleration of any one of said wheels having the greatest rate of deceleration below a certain uniform rate of deceleration for regulating the pressure in the brake cylinders so as to provide a substantially uniform rate of rotative deceleration of all said wheels, and means operatively responsive to the rotative deceleration of any one of said wheels whichever first exceeds said certain uniform rate for rapidly venting fluid under pressure from the brake cylinders to release the brakes on all of said wheels, and means operatively responsive to the rotative acceleration of any of said wheels back toward a speed corresponding to car speed during an application of the brakes whichever first exceeds a certain uniform rate for terminating the venting of fluid under pressure from the brake cylinders effected by the last said means and for causing a restoration of pressure in the brake cylinders.

16. In a brake system for a car or train, manually controlled means for effecting application and release of the brakes on the car or train, a rotary inertia device associated with a car wheel and operatively responsive to the acceleration and deceleration of said wheel, said inertia device having two parallel-connected switch devices, one of said switch devices being operated when the car wheel decelerates at a rate exceeding a certain rate and the other being operated when the car wheel accelerates in excess of said certain rate while the car wheel is slipping for one direction of rotation of the car wheel and vice versa for the opposite direction of rotation of the car wheel, means operated under the control of either one of the said switch devices during an application of the brakes for effecting the rapid release of the brakes independently of the manually controlled means, means for effecting reapplication of the brakes independently of the manually controlled means, and means operated under the control of either one of said switch devices, whichever is second to be operated, for effecting operation of the last two said means to respectively terminate the release and to reapply the brakes.

17. In a brake system for a car or train, manually controlled means for effecting application and release of the brakes on the car or train, rotary inertia means associated with a car wheel and operatively responsive to the rotative acceleration and deceleration of said wheel, said rotary inertia means having a pair of switches connected in parallel relation, either of said switches being operated to a closed position in response to the rotative deceleration or acceleration of the car wheel at a rate in excess of a certain rate while slipping, one of the switches being operated in response to deceleration and the other in response to acceleration of the car wheel for any one direction of rotation of the car wheel, means for effecting a rapid release of the brakes independently of the manually controlled means, means for effecting reapplication of the brakes independently of the manually controlled means, and means normally conditioned so that the first operation of one of said switches to closed position effects operation of said brake release means and being conditioned in response to the first operation of one of said switches, to render the other of said switches effective upon the subsequent operation thereof to cause operation of the release means to terminate the release and operation of said reapplication means to reapply the brakes.

18. In a brake system for a car or train, manually controlled means for effecting application and release of the brakes of the car or train, a switch device adapted to be operated normally only when a car wheel changes its speed of rotation at a rate in excess of a certain rate, electroresponsive means controlled by said switch device for controlling the brakes on said wheel independently of the manually controlled means, and means other than the electroresponsive means for delaying momentarily the variation of current supplied to said electroresponsive means after said switch device is operated for preventing undesired operation of the electroresponsive means upon momentary undesired and abnormal operation of the switch device.

19. In a brake system for car or train, manually controlled means for effecting application and release of the brakes on the car or train, a switch device adapted to be normally operated to its closed position only when a car wheel changes its speed of rotation at a rate in excess of a certain rate, electroresponsive means controlled by said switch device for controlling the brakes on said wheel independently of the manually controlled means, and inductive means for delaying the supply of current to the said electroresponsive means for a short interval of time following closure of said switch device for preventing the undesired operation of the electroresponsive means upon the momentary undesired and abnormal closure of the said switch device.

JOSEPH C. McCUNE.